US006831440B1

(12) United States Patent
Royak et al.

(10) Patent No.: US 6,831,440 B1
(45) Date of Patent: Dec. 14, 2004

(54) FLUX POSITION IDENTIFIER USING HIGH FREQUENCY INJECTION

(75) Inventors: Semyon Royak, Beachwood, OH (US); Mark M. Harbaugh, Richfield, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 10/610,427

(22) Filed: Jun. 30, 2003

(51) Int. Cl.[7] ................................................ H02P 1/24

(52) U.S. Cl. ...................... 318/727; 318/799; 318/802; 318/811

(58) Field of Search ................................ 318/727, 799, 318/800–802, 805–812, 632

(56) References Cited

U.S. PATENT DOCUMENTS

| | | | | |
|---|---|---|---|---|
| 4,088,934 A | * | 5/1978 | D'Atre et al. ............... | 318/802 |
| 4,418,308 A | * | 11/1983 | Bose ........................... | 318/803 |
| 5,334,923 A | * | 8/1994 | Lorenz et al. ............... | 318/805 |
| 5,502,360 A | | 3/1996 | Kerkman et al. | |
| 5,510,689 A | * | 4/1996 | Lipo et al. ................... | 318/809 |
| 5,559,419 A | | 9/1996 | Jansen et al. | |
| 5,689,169 A | | 11/1997 | Kerkman et al. | |
| 6,281,659 B1 | | 8/2001 | Giuseppe | |
| 6,636,012 B2 | * | 10/2003 | Royak et al. ............... | 318/727 |
| 6,703,809 B2 | * | 3/2004 | Royak et al. ............... | 318/727 |

OTHER PUBLICATIONS

A New Zero Frequency Flux Position Detection Approach for Direct Field Oriented Control Drives; 1999 IEEE, pp. 2290–2297, Consoli, et al.
Using Multiple Saliencies for the Estimation of Flux, Position, and Velocity in AC Machines; 1998 IEEE Transactions on INdustry Application, vol. 34, No. 5, et al. Sep./Oct. 1998 pp. 1097–1104, Degner.

(List continued on next page.)

Primary Examiner—Rina Duda
(74) Attorney, Agent, or Firm—Quarles & Brady LLP; William R. Walbrun

(57) ABSTRACT

A method and apparatus for use with a controller that uses a flux angle position value to control a three phase induction machine, the method for determining an instantaneous flux angle position value in the machine where the machine is characterized by a system specific dominant harmonic frequency number $D_H$ that is at least two, the method comprising the steps of injecting a high frequency voltage signal having a high frequency value into the machine thereby generating a high frequency current within the stator windings, obtaining a high frequency feedback signal from the machine, mathematically combining the high frequency value and the dominant harmonic number $D_H$ to provide an instantaneous modified angle, using the feedback signal to identify X consecutive calculating instances during each Y consecutive feedback signal cycles where Y is at least two, at each of the X different calculating instances, identifying an instantaneous flux angle position value by mathematically combining a shift angle with the instantaneous modified angle where the shift angles corresponding to each of the X different calculating instances are all different and providing the instantaneous flux angle position value to the controller.

25 Claims, 10 Drawing Sheets

OTHER PUBLICATIONS

Sensorless Field Orientation Control Of An Induction Machine by High Frequency Signal Injection, IEEE Industry Applications Society Annual Meeting, Oct. 1997, pp. 426–432, Ha et al.

Air–Gap Flux Position Estimation of Inaccessible Neutral Induction Machines by Zero Sequence Voltage; Consoli, et al.

Sensorless Field Orientated Control Using Common Mode Currents; Consoli et al.

U.S. Appl. No.: 10/092,046 filed Mar. 5, 2002, Flux Position Identifier Using High Frequency Injection With The Presence of A Rich Harmonic Spectrum in A Responding Signal, Rovak et al.

U.S. Appl. No. 09/967,112 titled "Stator and Rotor Resistance Identity Using High Frequency Injection" field Sep. 28, 2001.

* cited by examiner

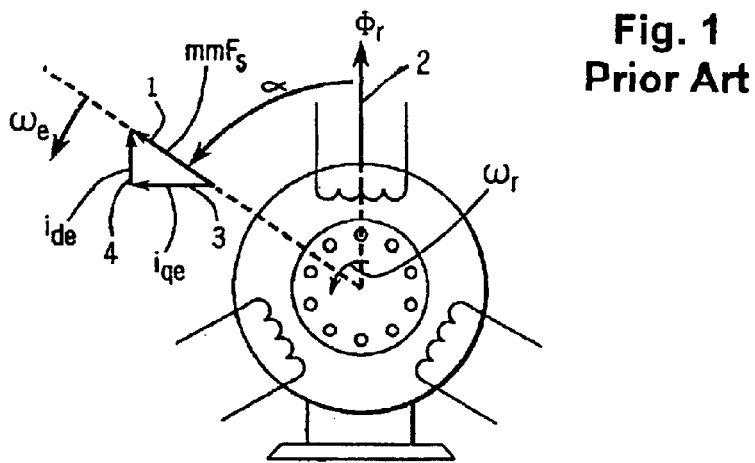
Fig. 1
Prior Art
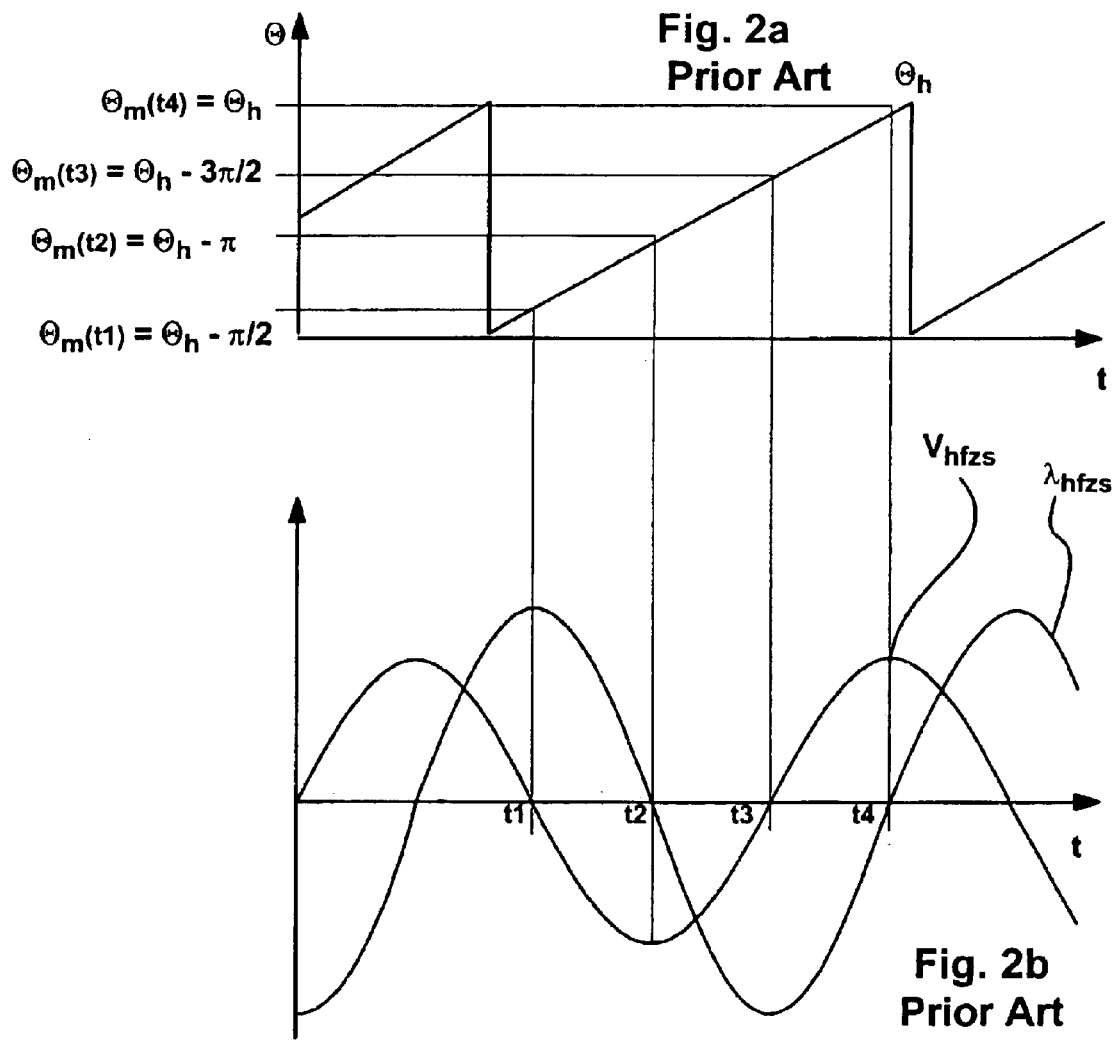
Fig. 2a
Prior Art
Fig. 2b
Prior Art

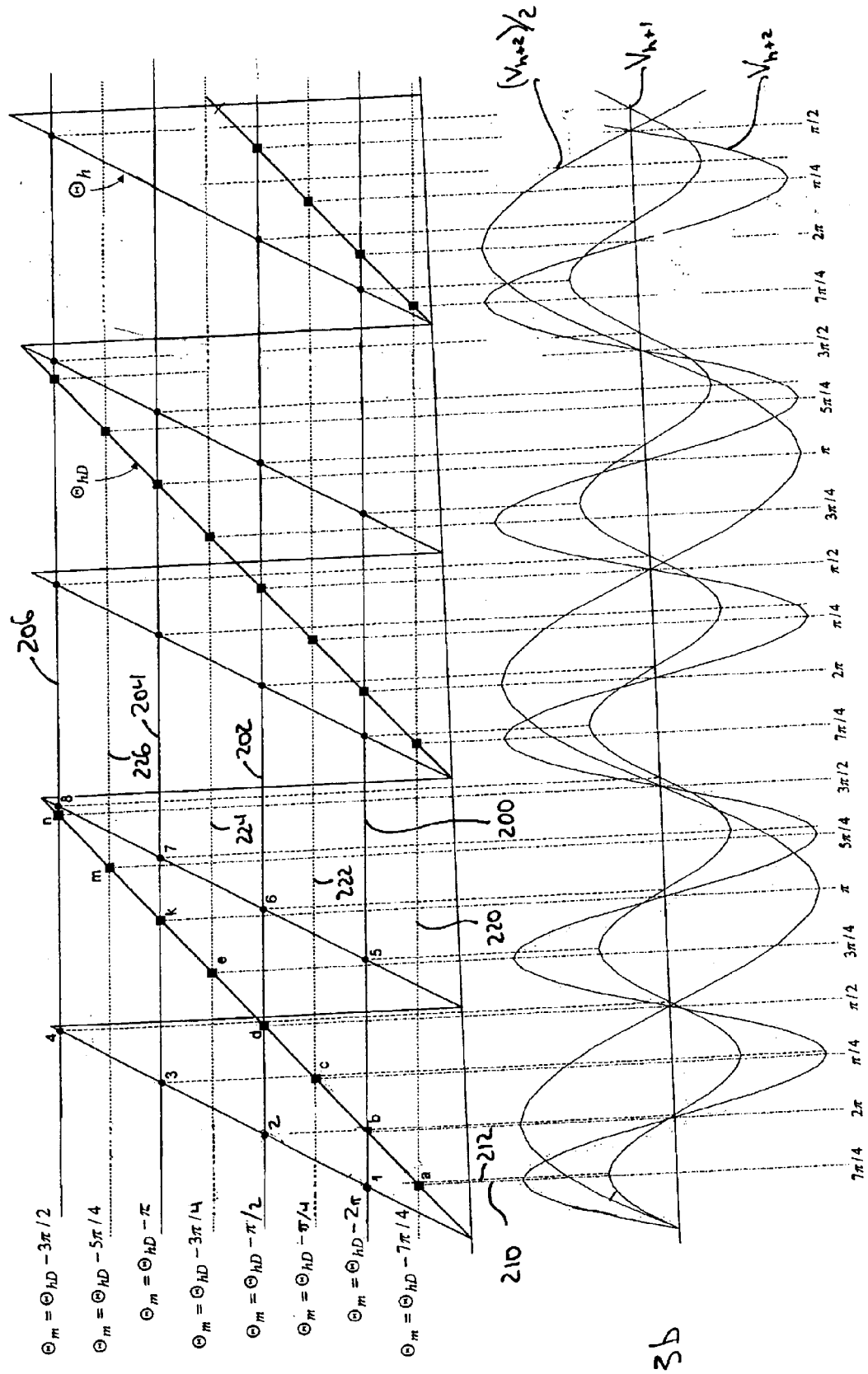

FLUX POSITION IDENTIFIER USING HIGH FREQUENCY INJECTION

CROSS-REFERENCE TO RELATED APPLICATIONS

Not applicable.

STATEMENT REGARDING FEDERALLY SPONSORED RESEARCH OR DEVELOPMENT

Not applicable

BACKGROUND OF THE INVENTION

The field of the invention is AC induction motor drives and more specifically the area of injecting high frequency voltage signals into an AC induction motor and using high frequency feedback signals to identify stator flux position.

Induction motors have broad application in industry, particularly when large horsepower is needed. In a three-phase induction motor, three phase alternating voltages are impressed across three separate motor stator windings and cause three phase currents therein. Because of inductances, the three currents typically lag the voltages by some phase angle. The three currents produce a rotating magnetic stator field. A rotor contained within the stator field experiences an induced current (hence the term "induction") which generates a rotor field. The rotor field typically lags the stator field by some phase angle. The rotor field is attracted to the rotating stator field and the interaction between the two fields causes the rotor to rotate.

A common rotor design includes a "squirrel cage winding" in which axial conductive bars are connected at either end by shorting rings to form a generally cylindrical structure. The flux of the stator field cutting across the conductive bars induces cyclic current flows through the bars and across the shorting rings. The cyclic current flows in turn produce the rotor field. The use of this induced current to generate the rotor field eliminates the need for slip rings or brushes to provide power to the rotor, making the design relatively maintenance free.

To a first approximation, the torque and speed of an induction motor may be controlled by changing the frequency of the driving voltage and thus the angular rate of the rotating stator field. Generally, for a given torque, increasing the stator field rate will increase the speed of the rotor (which follows the stator field). Alternatively, for a given rotor speed, increasing the frequency of the stator field will increase the torque by increasing the slip, that is the difference in speed between the rotor and the stator fields. An increase in slip increases the rate at which flux lines are cut by the rotor, increasing the rotor generated field and thus the force or torque between the rotor and stator fields.

Referring to FIG. 1, a rotating phasor 1 corresponding to a stator magneto motive force ("mmf") will generally have some angle $\alpha$ with respect to the phasor of rotor flux 2. The torque generated by the motor will be proportional to the magnitudes of these phasors 1 and 2 but also will be a function of their angle $\alpha$. Maximum torque is produced when phasors 1 and 2 are at right angles to each other whereas zero torque is produced if the phasors are aligned. The stator mmf phasor 1 may therefore be usefully decomposed into a torque producing component 3 perpendicular to rotor flux phasor 2 and a flux component 4 parallel to rotor flux phasor 2.

These two components 3 and 4 of the stator mmf are proportional, respectively, to two stator current components: $i_q$, a torque producing current, and id, a flux producing current, which may be represented by quadrature or orthogonal vectors in a rotating or synchronous frame of reference (i.e., a reference frame that rotates along with the stator flux vector) and each vector $i_q$ and $i_d$ is characterized by slowly varying DC magnitude.

Accordingly, in controlling an induction motor, it is generally desired to control not only the frequency of the applied voltage (hence the speed of the rotation of the stator flux phasor 1), but also the phase of the applied voltage relative to the current flow and hence the division of the currents through the stator windings into the $i_q$ and $i_d$ components. Control strategies that attempt to independently control current components $i_q$ and $i_d$ are generally referred to as field oriented control strategies ("FOC").

Generally, it is desirable to design FOC strategies that are capable of driving motors of many different designs and varying sizes. Such versatility cuts down on research, development, and manufacturing costs and also results in easily serviceable controllers. Unfortunately, while versatile controllers are cost-effective, FOC controllers cannot control motor operation precisely unless they can adjust the division of d and q-axis currents through the stator windings to account for motor-specific operating parameters. For this reason, in order to increase motor operating precision, various feedback loops are typically employed to monitor stator winding currents and voltages and/or motor speed. A controller uses feedback information to determine how the inverter supplied voltage must be altered to compensate for system disturbances due to system specific and often dynamic operating parameters and then adjusts control signals to supply the desired inverter voltages.

To this end, in an exemplary FOC system, two phase d and q-axis command currents are provided that are calculated to control a motor in a desired fashion. The command currents are compared to d and q-axis motor feedback currents to generate error signals (i.e., the differences between the command and feedback currents). The error signals are then used to generate d and q-axis command voltage signals which are in turn transformed into three phase command voltage signals, one voltage signal for each of the three motor phases. The command voltage signals are used to drive a pulse width modulated (PWM) inverter that generates voltages on three motor supply lines. To provide the d and q-axis current feedback signals the system typically includes current sensors to sense the three phase line currents and a coordinate transformation block is used to transform the three phase currents to two phase synchronous dq frame of reference feedback currents.

In addition to requiring two phase signals and three phase signals to perform 2-to-3 and 3-to-2 phase transformations, respectively, a precise flux position angle estimate $\theta'_m$ is also required. One common way to generate a flux angle feedback estimate is to integrate a stator frequency. A stator frequency can be determined by adding a measured rotor frequency (rotor speed) and a calculated slip frequency. In the case of drives that do not include a rotor speed sensor, it is necessary to estimate both the rotor frequency and the slip frequency to determine the flux angle. Thus, these drives require precise knowledge of motor parameter values.

In an effort to reduce system costs and increase reliability, the controls industry has recently developed various types of sensorless or self-sensing induction machine systems that, as the labels imply, do not include dedicated speed sensing hardware and corresponding cabling but that, nevertheless, can generate accurate position, flux and velocity estimates.

Techniques used for operating parameter estimation can be divided into two groups including techniques that track speed dependent phenomenon and techniques that track spatial saliencies in system signals. These techniques generally use disturbances in d and q-axis feedback currents to identify the operating parameters of interest and hence provide additional functionality which, in effect, "piggybacks" on feedback signals that are obtained for another purpose (i.e., dq current components are already required for FOC).

Because speed dependent techniques depend on speed in order to generate an identifiable feedback signal, these techniques ultimately fail at zero or low (e.g., below 5 Hz) excitation frequency due to lack of signal. In addition, because these methods estimate operating parameters from voltage and current, these techniques are sensitive to temperature varying system parameters such as stator resistance, etc.

One type of saliency tracking technique includes injecting or applying a known high frequency "injection" voltage signal in addition to each of the command voltage signals used to drive the PWM inverter and using feedback current (or voltage) signals to identify saliencies associated with the flux angle. To this end, an exemplary system converts a high frequency command signal into a high frequency phase angle and generates a first injection signal that is the product of a scalar and the sine of the high frequency phase angle. Second and third injection signals are also generated, each of the second and third signals phase shifted from the first signal by 120 degrees. A separate one of the first, second and third signals is then added to a separate one of the three voltage command signals that are used to drive the PWM inverter.

One injection type saliency tracking algorithm to generate a flux position angle estimate without a rotor speed sensor employs a negative sequence of the high frequency current component and is described in an article that issued in the IEEE Transactions on Industry Applications publication, vol. 34, No. 5, September/October 1998 by Robert Lorenz which is entitled "Using Multiple Saliencies For The Estimation Of Flux Position, And Velocity In AC Machines" (hereinafter "the Lorenz article"). The algorithm in the Lorenz article is based on the fact that when a high frequency voltage signal (referred to in the Lorenz article as a "carrier signal") is injected into a rotating system, a resulting high frequency field interacts with system saliency to produce a "carrier" signal current that contains information relating to the position of the saliency. The carrier current consists of both positive and negative-sequence components relative to the carrier signal voltage excitation. While the positive sequence component rotates in the same direction as the carrier signal voltage excitation and therefore contains no spatial information, the negative-sequence component contains spatial information in its phase. The Lorenz article teaches that the positive sequence component can be filtered off leaving only the negative-sequence component which can be fed to an observer used to extract flux angle position information.

Unfortunately, algorithms like the algorithm described in the Lorenz article only works well if an induction machine is characterized by a single sinusoidally distributed spatial saliency. As known in the art, in reality, motor currents exhibit more than a single spatial saliency in part due to the fact that PWM inverters produce a plethora of harmonics. As a result, the phase current negative sequence comprises a complicated spectrum that renders the method described in the Lorenz article relatively inaccurate.

Injection type saliency tracking algorithms employ a zero sequence high frequency current or voltage component instead of the negative sequence current component. One such technique is described in an article that issued in the IEEE IAS publication, pp. 2290–2297, Oct. 3–7, 1999, Phoenix Ariz., which is entitled "A New Zero Frequency Flux Position Detection Approach For Direct Field Orientation Control Drives" (hereinafter "the Consoliarticle"). The Consoli article teaches that the main field of an induction machine saturates during system operation which causes the spatial distribution of the air gap flux to assume a flattened sinusoidal waveform including all odd harmonics and dominated by the third harmonic of the fundamental. The third harmonic flux component linking the stator windings induces a third harmonic voltage component (i.e., a voltage zero sequence) that is always orthogonal to the flux component and that can therefore be used to determine the flux position. Unfortunately, the third harmonic frequency is low band width and therefore not particularly suitable for instantaneous position determination needed for low speed control.

The Consoli article further teaches that where a high frequency signal is injected into a rotating system, the injected signal produces a variation in the saturation level that depends on the relative positions of the main rotating field and high frequency rotating field. Due to the fundamental component of the main field, the impedance presented to the high frequency injected signal varies in space and this spatial variance results in an unbalanced impedance system. The unbalanced system produces, in addition to the fundamental zero sequence component of air gap flux and voltage, additional high frequency components having angular frequencies represented by the following equation:

$$\omega_{h1zs} = \omega_h \pm \omega_1 \qquad \text{Eq. 1}$$

where:

$\omega_{h1zs}$=the high frequency voltage zero sequence component frequency;

$\omega_h$=the high frequency injection signal frequency;

$\omega_1$=fundamental stator frequency first harmonic frequency; and where the sign "±" is negative if the high frequency "injected" signal has a direction that is the same as the fundamental field direction and is positive if the injected signal has a direction opposite the fundamental field direction.

In this case, referring to FIGS. 2a and 2b, a zero sequence air gap flux component $\lambda_{htzs}$ that results from the complex interaction of the zero sequence flux produced by the fundamental component and the impressed high frequency injected signals induces a zero sequence voltage component $V_{hfzs}$ on the stator winding that always leads the zero sequence flux component $\lambda_{hfzs}$ by 90°. The maximum zero sequence flux component $\lambda_{hfzs}$ always occurs when the main and high frequency rotating fields are aligned and in phase and the minimum zero sequence flux component $\lambda_{hfzs}$ always occurs when the main and high frequency rotating fields are aligned but in opposite phase. Thus, in theory, by tracking the zero crossing points of the high frequency zero sequence component $V_{hfzs}$ and the instances when minimum and maximum values of the high frequency zero sequence voltage component $V_{hfzs}$ occur, the position of the high frequency rotating field $\theta_h$ can be used to determine the main air gap flux position $\theta_m$.

For instance, referring to in FIGS. 2a and 2b, and also to FIGS. 9 and 10, at time t1 (see FIG. 9) when voltage $V_{hfzs}$ is transitioning from positive to negative and crosses zero, the main field $F_m$ is in phase and aligned with the high frequency flux $\lambda_{hfzs}$ (i.e., field $F_h$) which lags voltage $V_{hfzs}$ by 90° and therefore main field angle $\theta_m$ is $\theta_h-\pi/2$ (where $\theta_h$ is the high frequency injected signal angle). As indicated in FIG. 2b, at time t1 voltage $V_{hfzs}$ has a zero value. Nevertheless, in FIG. 9 voltage $V_{hfzs}$ is illustrated as having a magnitude so that angle $\theta_h$ is illustrated as having a magnitude so that angle $\theta_h$ can be illustrated. Similar comments are applicable to FIG. 10 and time t3.

At time t2 where voltage $V_{hfzs}$ reaches a minimum value, the main field $F_m$ and flux $\lambda_{hfzs}$ are in quadrature and therefore main field angle $F_m$ can be expressed as $\theta_h-\pi$ (i.e., 90° between signal $V_{hfzs}$ and flux $\lambda_{hfzs}$ and another 90° between flux $\lambda_{hfzs}$ and main field $f_m$ for a total of $\pi$). At time t3 (see FIG. 10) where voltage $V_{hfzs}$ is transitioning from negative to positive through zero, the main field is out of phase with flux $\lambda_{hfzs}$ and therefore main field angle $\theta_m$ can be expressed as $\theta_h-3\pi/2$. Similarly, at time t4 voltage $V_{hfzs}$ reaches a maximum value with the main field $F_m$ and flux $\lambda_{hfzs}$ (i.e., field $F_h$) again in quadrature and main field $F_m$ leading flux $\lambda_{hfzs}$ and therefore main field angle $\theta_m$ is equal to high frequency angel $\theta_h$.

Unfortunately, as in the case of the negative current component signal employed by Lorenz, high frequency zero sequence feedback signals contain a complicated harmonic spectrum mostly due to the PWM technique employed where the spectrum can be represented by the following equations:

$$\omega_{h1zs}=\pm\omega_h\pm\omega_1 \quad \text{Eq. 2}$$

$$\omega_{h2zs}=\pm\omega_h\pm\omega_2 \quad \text{Eq. 3}$$

$$\omega_{h4zs}=\pm\omega_h\pm\omega_4 \quad \text{Eq. 4}$$

$$\omega_{h6zs}=\omega_h\pm\omega_6, \text{etc.} \quad \text{Eq. 5}$$

where:

$\omega_{h1zs}$, $\omega_{h2zs}$, $\omega_{h4zs}$, etc., are components of a harmonic spectrum of a high frequency current (or voltage) zero sequence signal and $\omega_1$, $\omega_2$, $\omega_4$, etc., are the $1^{st}$, $2^{nd}$, $4^{th}$, etc harmonic frequencies of the fundamental stator frequency. The ± signs are determined according to the convention described above with respect to Equation 1. The complicated zero sequence spectrum renders the method described in Consoli relatively inaccurate.

U.S. patent application Ser. No. 10/092,046 (hereinafter "the '046 reference") which is entitled "Flux Position Identifier Using High Frequency Injection With The Presence Of A Rich Harmonic Spectrum In A Responding Signal" which was filed Mar. 5, 2002 and which is commonly owned with the present invention is incorporated herein by reference. Consistent with the comments above, the '046 reference teaches that when a high frequency injection signal is injected into an induction based system which is operating at a stator fundamental frequency, the high frequency signal interacts with the stator field to generate a resulting high frequency current (and corresponding voltage) that has a complicated initial high frequency spectrum that includes a component at the injection frequency as well as components (hereinafter "sideband components") at various frequencies within sidebands about the injection frequency that are caused by inverter harmonics as well as interaction between system saliencies and the injected signals. The sideband components are at frequencies equal to the injection frequency plus or minus multiples of the fundamental frequency. For instance, where the injection frequency is 500 Hz and the fundamental frequency is 2 Hz, the sideband components may include frequencies of 494 Hz, 496 Hz, 498 Hz, 502 Hz, 504 Hz, 506 Hz, etc.

In addition, the '046 reference recognizes that, given a specific motor control system configuration (i.e., specific hardware and programmed operation), a dominant sideband frequency has the largest amplitude. This dominant sideband frequency for the system configuration always corresponds to the sum of the injection frequency and a specific harmonic of the fundamental where the specific harmonic number is a function of system design and operating parameters. For instance, given a first system configuration, the system specific dominant sideband frequency may be the sum of the injection frequency and the $4^{th}$ harmonic of the fundamental while, given a second system configuration, the system specific dominant sideband frequency may be the sum of the injection frequency and the $2^{nd}$ harmonic of the fundamental frequency. The harmonic with the largest amplitude that is added to the injection frequency to obtain the dynamic sideband frequency corresponding to a specific system is referred to hereinafter as the system specific dominant harmonic number ($D_H$). For instance, in the two examples above the system specific $D_H$s are 4 and 2, respectively.

Moreover, the '046 reference recognizes that during a commissioning procedure, the system specific $D_H$ can be determined using a FFT analysis or using a spectrum analyzer or some other similar type of device. Thus, in the case of the first and second exemplary systems above, the $4^{th}$ and $2^{nd}$ harmonics would be identified, respectively, as corresponding system specific $D_{Hs}$.

In light of the above realizations, the '046 reference teaches a system designed to strip the injection frequency value out of each initial spectrum frequency thereby generating a low frequency spectrum including a separate frequency corresponding to each of the initial spectrum frequencies. For instance, in the above example where the fundamental and injection frequencies are 2 Hz and 500 Hz, respectively, and assuming sideband frequencies within the initial spectrum at 494 Hz, 496 Hz, 498 Hz, 502 Hz, 504 Hz and 506 Hz, after stripping, the low frequency spectrum includes modified sideband frequencies at −6 Hz, −4 Hz, −2 Hz, 2 Hz, 4 Hz and 6 Hz.

After the low frequency spectrum value has been generated, the '046 reference teaches that the low frequency spectrum can be divided by the system specific dominant harmonic number $D_H$ thereby generating a modified frequency spectrum where the dominant frequency value is the fundamental frequency (i.e., fundamental frequency value has the largest amplitude).

More specifically, at least one embodiment disclosed in the '046 reference filters out the positive sequence components of the high frequency feedback currents and generates stationary high frequency a and 5-axis negative-sequence components. These stationary components are orthogonal and together include the noisy initial spectrum about the high injection frequency.

As well known in the art, in the case of any stationary to synchronous component signal conversion an angle that corresponds to the rotating components must be known. Where the angle is accurate, the resulting synchronous d and q-axis components are essentially DC values. However, where the angle is inaccurate, the resulting components fluctuate and the resulting d and q-axis components are not completely synchronous.

The '046 reference teaches that a phase locked loop (PLL) adaptively generates a high frequency angle estimate that includes components corresponding to all high frequencies in the stationary α and β-axis negative sequence components. The angle estimate is used to convert the stationary high frequency a and p-axis negative-sequence components to synchronous d and q-axis negative-sequence components. Thereafter, one of the d or q-axis components is negated and the resulting negated or difference value is fed to a PI controller or the like to step up the difference value and generate the low frequency spectrum.

The angle estimate is adaptively generated by adding the high injection frequency and the low frequency spectrum to generate a combined frequency spectrum and then integrating the combined frequency spectrum. Thus, the angle estimate is accurate when the combined frequency spectrum matches the actual frequency spectrum that exists in the stationary a and O-axis negative sequence components and, where there is a difference between the combined frequency spectrum and the stationary a and D-axis components, that difference is reflected in the synchronous d and q-axis components which adaptively drive the PI regulator and adjusts the low frequency spectrum.

The low frequency spectrum is combined mathematically with the system specific dominant harmonic number to generate a stator fundamental frequency estimate. After the stator frequency is identified, the stator frequency can be integrated to generate an air gap flux angle estimate $F_m$ and other operating parameters of interest in control systems.

According to another embodiment described in the '046 reference, instead of employing the three phase feedback currents to identify the complex frequency spectrum, a zero sequence voltage or current signal is employed. To this end, unlike the case where the high frequency current is resolved into quadrature d and q-axis components, the zero sequence embodiment includes a feedback loop that only senses and feeds back a single common mode component. With the zero sequence voltage (or current) feedback signal being a stationary α-axis signal, an artificial stationary β-axis signal is generated by integrating the α-axis signal to generate an integrated signal, low pass filtering the integrated signal to generate a filtered signal and subtracting the filtered signal from the integrated signal thereby providing the high frequency component of the integrated signal as the β-axis signal.

Consistent with the high frequency current example described above, after the α and artificial β-axis components are generated, the stationary α and β-axis signals are converted to synchronous high frequency d and q-axis signals and one of the d or q-axis signals is used to drive the PLL. Operation of the PLL in this embodiment is similar to operation of the embodiment described above.

While the concepts described in the '046 reference are advantageous and suitable for certain applications where PLL capabilities are supported, in other cases such capabilities are not supported or preferably are not supported and therefore some other method for determining the main field flux angle in a rich harmonic system would be advantageous.

BRIEF SUMMARY OF THE INVENTION

It has been recognized that the clearest and most accurately recognizable component of the high frequency zero sequence feedback signal and hence the component optimally used to identify the flux angle is the dominant harmonic component. It has also been recognized, however, that the dominant harmonic zero sequence feedback component cannot be employed directly in a Consoli type flux angle determining algorithm to yield accurate instantaneous flux angle values. To this end, assume that the fundamental frequency is 1 Hz, the frequency of the injected voltage is 500 Hz, a high frequency first harmonic is 501 Hz and that a high frequency second harmonic is 502 Hz. In addition, for the purposes of this explanation, assume that the high frequency second harmonic is the dominant harmonic component. Referring to FIGS. 3a and 3b, FIG. 3b includes waveforms $V_{h+1}$ and $V_{h+}2$ while FIG. 3a includes waveform $\theta_h$. Waveform $V_{h+}1$ is similar to waveform $V_{hfzs}$ in FIG. 2b and corresponds to the 501 Hz high frequency first harmonic, waveform $V_{h+}2$ corresponds to the 502 Hz high frequency second harmonic. Wave form $\theta_h$ is the instantaneous phase angle of the 500 Hz high frequency injected voltage.

According to Consoli, each instance corresponding to a zero crossing, maximum or minimum of the high frequency first harmonic $V_{h+}1$ can be used as a trigger to identify the main air gap flux angle $\theta_m$ according to a standard set of four equations. Thus, for points 1 through 4 in FIG. 3a that correspond to a maximum value, a zero crossing from positive to negative, a minimum value and a zero crossing from negative to positive on the high frequency first harmonic $V_{h+}1$, respectively, the following equations can be used to identify angle $\theta_m$.

for points 1 and 5: $\Theta_m = \Theta_h - 2\pi$    Eq. 6 for points 2 and 6: $\Theta_m = \Theta_h - \pi/2$    Eq. 7 for points 3 and 7: $\Theta_m = \Theta_h - \pi$    Eq. 8 for points 4 and 8: $\Theta_m = \Theta_h - 3\pi/2$    Eq. 9 respectively. Similarly, during the next cycle of the injected high frequency voltage, at points 5, 6, 7 and 8 corresponding to maximum, zero crossing from positive to negative, minimum and zero crossing from negative to positive instances of high frequency first harmonic $V_{h+}1$, equations 6–9 can be used, respectively, to identify angle $\theta_m$.

Points 1 and 5 define a main flux common equation line 200. As its label implies, line 200 corresponds to angles $\theta_x$ that are phase shifted $2\pi$ from the main flux angel $\theta_m$ such that, if angle $\theta_x$ can be determined at any point on line 200, angle $\theta_m$ can be determined by subtracting 27 from the determined angle $\theta_x$—hence equation 6 above. Similarly; each of lines 202, 204 and 206 defined by point pairs 2 and 6, 3 and 7, and 4 and 8 is a main flux common equation line corresponding to angles $\theta_x$ that are phase shifted $\pi/2$, $\pi$ and $3\pi/2$ from main flux angle $\theta_m$.

Referring still to FIGS. 3a and 3b, while phase angle waveform $\theta_h$ intersects each common equation line 200, 202, 204 and 206 at one of the high frequency first harmonic zero crossing, maximum or minimum instances and hence the angle $\theta_x$ (i.e., $\theta_h$) can be determined at each of points 1 through 4, unfortunately, the zero crossing, maximum and minimum times of second harmonic $V_{h+}2$ do not similarly align with points 1 through 4 (i.e., do not align with the intersection of known common equation lines and injected angle waveform $\theta_h$). For example, as illustrated, a vertical line 210 corresponding to the maximum value of second harmonic waveform $V_{h+}2$ during the first illustrated cycle occurs before the vertical line 212 corresponding to the maximum value of first harmonic waveform $V_{h+}1$ and therefore would intersect waveform $\theta_h$ before point 1. In this case Equation 6 above would not be valid. Similarly, each of the vertical lines (not separately labeled) corresponding to the positive to negative zero crossing, minimum value and negative to positive zero crossing of second harmonic waveform $V_{h+}2$ during the first illustrated cycle occur before the vertical lines corresponding to the positive to negative zero crossing, minimum value and negative to positive zero crossing of first harmonic waveform $V_{h+}1$ and therefore none of Equations 7–9 could be used to accurately determine angle $\theta_m$ at those instances. It should be appreciated that the degree of phase shift between similar points (e.g., positive to negative zero crossings) on the first and second harmonic waveforms $V_{h+}1$ and $V_{h+}2$, respectively, changes during consecutive high frequency cycles and therefore is difficult to track.

Thus, Consoli's Equations 6–9 above do not work with the high frequency second harmonic. Although not illustrated, the Consoli Equations also do not work with other dominant harmonics including the $4^{th}$, the $8^{th}$, etc., as the zero crossing and maximum and minimum times associated with those harmonics likewise do not align with points 1 through 4 (i.e., with intersecting points of common equation lines and the angle $\theta_h$ of the high frequency injected signal).

Referring yet again to FIG. 3a, in addition to waveform $\theta_h$, FIG. 3a also includes a modified angle waveform $\theta_{hD}$ that is determined by integrating the ratio of the frequency of the injected high frequency signal and the dominant harmonic number $D_H$. Here, consistent with the present example where the injected signal has a frequency of 500 Hz and the dominant harmonic number $D_H$ is 2, angle $\theta_{hD}$ corresponds to a frequency of 250 Hz (i.e., 500/2).

FIG. 3b includes waveform $(V_{h+}2)/2$ which corresponds to the high frequency second harmonic divided by two (i.e., the frequency is divided by 2). Thus, in the present example, waveform $(V_{h+}2)/2$ has a frequency of 251 (i.e., 502/2). Hereinafter waveform $(V_{h+}2)/2$ will be referred to as the modified second harmonic.

Referring specifically to waveforms $\theta_{hD}$ and $(V_{h+}2)/2$, it should be appreciated that the times of the maximum, zero crossing from positive to negative, minimum and zero crossing from negative to positive instances align with points b, d, k and n on waveform $\theta_{hD}$ where points b, d, k and n reside on common equation lines 200, 202, 204 and 206, respectively. Thus, at times corresponding to points b, d, k, and n equations similar to equations 6–9 above can be used to determine the main flux angle $\theta_m$, the only difference being that the instantaneous modified angle $\theta_{hD}$ is substituted for the instantaneous high frequency angle $\theta_h$. Importantly, the maximum positive to negative zero crossing, minimum and negative to positive zero crossing times of modified second harmonic $(V_{h+}2)/2$ occur at positive to negative and negative to positive zero crossing times during two consecutive cycles of second harmonic $V_{h+}2$ and therefore can be easily determined from the second harmonic zero sequence feedback signal.

While using equations 6–9 at times corresponding to maximum, positive to negative zero crossing, minimum and negative to positive zero crossing instances of modified second harmonic $(V_{h+}2)/2$ advantageously yields four (e.g., at points b, d, k and n) flux angle $\theta_m$ values every modified second harmonic cycle, four values per modified second harmonic cycle is only half the values that Consoli provides over the same cycle period. It has also bee recognized that four additional $\theta_m$ values at points a, c, e and m (see again FIG. 3a) can be determined by identifying the maximum and minimum times of two consecutive cycles of second harmonic $V_{h+2}$ where points a and e correspond to consecutive maximum times and points c and m correspond to consecutive minimum times and solving equations similar to equations 6–9. For points a, c, e and m, as for points b, d, k and n, instantaneous angle $\theta_{hD}$ is substituted for angle $\theta_h$. In addition, the shift angles are modified as points a, c, e and m reside on common equation lines 220, 222, 224 and 226 where the shift angels are $7\pi/4$, $\pi/4$, $3\pi/f$ and $5\pi/r$, respectively. The resulting equations for points a, b, c, d, e, k, m and n are:

for points a: $\theta_m = \theta_{hD} - 7\pi/4$      Eq. 10 for points b: $\theta_m = \theta_{hD} - 2\pi$      Eq. 11 for points c: $\theta_m = \theta_{hD} - \pi/4$      Eq. 12 for points d: $\theta_m = \theta_{hD} - \pi/2$      Eq. 13 for points e: $\theta_m = \theta_{hD} - 3\pi/4$      Eq. 14 for points k: $\theta_m = \theta_{hD} - \pi$      Eq. 15 for points m: $\theta_m = \theta_{hD} - 5\pi/4$      Eq. 16 for points n: $\theta_m = \theta_{hD} - 3\pi/2$      Eq. 17

Thus, for the first four points a, b, c and d the maximum, minimum and zero crossing times of a leading or first period of the second harmonic zero sequence feedback signal are used to determine main field flux angle $\theta_m$ and, for the next four points e, k, m and n, the maximum, minimum and zero crossing times of a following or second period of the second harmonic zero sequence feedback signal are used to determine flux angle $\theta_m$ so that angle $\theta_{mm}$ is pieced together over consecutive high frequency cycles and performance as good as Consoli's is achieved despite rich harmonics and a dominant harmonic number of two.

In the case of a system that generates a dominant fourth harmonic feedback signal (i.e., $D_H = 4$), angle $\Theta_{hD}$ and hence $\Theta_m$ are determined during four consecutive cycles of the fourth harmonic zero sequence signal. In this case, angle $\Theta_{hD}$ is determined by integrating the ratio of the frequency of the injected voltage divided by dominant harmonic number $D_H = 4$ and sixteen equations similar to equations 10 through 17 are used to shift the resulting modified angle $\theta_{hD}$ by different shift angles thereby generating sixteen angel $\theta_m$ determinations (i.e., the same number of $\theta_m$ determinations as provided by Consoli during the same period). As a general rule, the shift angles (i.e., the angles added to the dominant harmonic angles $\Theta_{hD}$) are multiples of $2\pi/4D_H$ and thus the sixteen equations have different shift angles ranging from $\pi/8$ to $2\pi$ separated by $\lambda/8$.

Thus, one object of the invention is to provide a method and apparatus that identifies the main flux angle in rich harmonic systems that has performance characteristics similar to the characteristics of Consoli. As described above, the present invention performs as well as Consoli despite rich harmonics and irrespective of which harmonic is dominant in a feedback signal.

Another object is to provide a method and apparatus that accurately provides flux angle values in a rich harmonic system. Here instead of providing angle $\theta_m$ estimates at the same rate as Consoli, in some embodiments where less frequent updates are required, fewer equations may be employed: For instance, instead of employing all eight Equations 10–17, one embodiment may employ only Equation 11, 13, 15 and 17 at corresponding times to identify $\theta_m$ at points b, d, k and n.

Consistent with the above, the invention includes a method for use with a controller that uses a flux angle position value to control a three phase induction machine, the method for determining an instantaneous flux angle position value in the machine where the machine is characterized by a system specific dominant harmonic frequency number $D_H$ that is at least two, the method comprising the steps of injecting a high frequency voltage signal having a high frequency value into the machine thereby generating a high frequency current within the stator windings, obtaining a high frequency feedback signal from the machine, mathematically combining the high frequency value and the dominant harmonic number $D_H$ to provide an instantaneous modified angle, using the feedback signal to identify X consecutive calculating instances during each Y consecutive feedback signal cycles where Y is at least two, at each of the X different calculating instances, identifying an instantaneous flux angle position value by mathematically combining a shift angle with the modified angle where the shift angles corresponding to each of the X different calculating instances are all different and providing the instantaneous flux angle position value to the controller. Here the high frequency zero sequence signal may be either a high frequency zero sequence current feedback signal or a high frequency zero sequence voltage feedback signal.

The invention also includes a method for use with a controller that uses a flux angle position value to control a three phase induction machine, the method for determining an instantaneous flux angle position value in the machine where the machine is characterized by a system specific dominant harmonic frequency number $D_H$ that is at least two, the method comprising the steps of: injecting a high frequency voltage signal having a high frequency value into the machine thereby generating a high frequency current within the stator windings, obtaining one of a high frequency zero sequence voltage feedback signal and a high frequency zero sequence current feedback signal from the machine, dividing the high frequency value and the dominant harmonic number $D_H$ to provide an instantaneous modified angle, using the feedback signal to identify four consecutive calculating instances during each of Y consecutive feedback signal cycles where Y is at least two, at each of the calculating instances during the Y consecutive feedback signal cycles, identifying an instantaneous flux angle position value by mathematically combining a shift angle with the instantaneous modified angle where the shift angles corresponding to each of the calculating instances during the Y consecutive feedback signal cycles are all unique shift angles and providing the instantaneous flux angle position value to the controller.

In addition, the invention includes a method for use with a controller that uses a flux angle position value to control a three phase induction machine, the method for determining an instantaneous flux angle position value in the machine where the machine is characterized by a system specific dominant harmonic frequency number $D_H$ that is at least two, the method comprising the steps of injecting a high frequency voltage signal having a high frequency into the machine thereby generating a high frequency current within the stator windings, obtaining one of a high frequency zero sequence voltage feedback signal and a high frequency zero sequence current feedback signal from the machine, integrating the feedback signal to generate a quadrature signal, identifying the zero crossing times of each of the feedback signal and the quadrature signal, dividing the high frequency by the dominant harmonic number $D_H$ to provide an instantaneous modified angle, at each of the zero crossing times during $D_H$ consecutive feedback signal cycles, identifying an instantaneous flux angle position value by mathematically combining a shift angle with the instantaneous modified angle where the shift angles corresponding to each of the zero crossing times during the $D_H$ consecutive feedback signal cycles are all unique shift angles and are multiples of $2\pi/4D_H$ and providing the instantaneous flux angle position value to the controller.

Furthermore, the invention includes an apparatus for use with a controller that uses a flux angle position value to control a three phase induction machine, the apparatus for determining an instantaneous flux angle position value in the machine where the machine is characterized by a system specific dominant harmonic frequency number $D_H$ that is at least two, the apparatus comprising a programmed processor performing the steps of: injecting a high frequency voltage signal having a high frequency value into the machine thereby generating a high frequency current within the stator windings, obtaining a high frequency feedback signal from the machine, mathematically combining the high frequency value and the dominant harmonic number $D_H$ to provide an instantaneous modified angle, using the feedback signal to identify X consecutive calculating instances during each Y consecutive feedback signal cycles where Y is at least two, at each of the X different calculating instances, identifying an instantaneous flux angle position value by mathematically combining a shift angle with the instantaneous modified angle where the shift angles corresponding to each of the X different calculating instances are all different and providing the instantaneous flux angle position value to the controller.

These and other objects, advantages and aspects of the invention will become apparent from the following description. In the description, reference is made to the accompanying drawings which form a part hereof, and in which there is shown a preferred embodiment of the invention. Such embodiment does not necessarily represent the full scope of the invention and reference is made therefore, to the claims herein for interpreting the scope of the invention.

BRIEF DESCRIPTION OF THE SEVERAL VIEWS OF THE DRAWINGS

FIG. 1 is a schematic view in cross section of an induction motor showing instantaneous locations of a rotor flux, a stator mmf and the torque and flux components of the stator mmf;

FIGS. 2a and 2b are related graphs where FIG. 2a illustrates an exemplary high frequency angle and FIG. 2b illustrates corresponding high frequency zero sequence voltage and flux signals;

FIG. 3a is similar to FIG. 2a, albeit illustrating both a high frequency angle and modified angle having a frequency that is half that of the high frequency angle and FIG. 3b illustrates a first harmonic zero sequence, a second harmonic zero sequence and a modified waveform having a frequency that is half the second harmonic frequency;

DETAILED DESCRIPTION OF THE INVENTION

In the description that follows, an superscript denotes a command signal, an "I" subscript denotes a feedback signal, an "h" subscript denotes a high frequency signal, an "i" denotes that a corresponding signal relates to a current signal, a 'V' denotes that a signal relates to a voltage signal, a "d" subscript denotes that a signal corresponds to a synchronous d-axis, a "q" subscript denotes that a signal corresponds to a synchronous q-axis, "u", "v" and "w" subscripts denote that corresponding signals relate to each of first, second and third system phases, a "zs" subscript also denotes a zero sequence signal, a "sw" subscript denotes a square wave, an "α" subscript denotes a stationary α-axis signal and a "β" subscript denotes a stationary p-axis signal.

While the following description details various blocks, steps, and functions, it should be remembered that all of these elements are meant to be implemented in software as computer programs and represent algorithms for execution by a conventional-type digital processor adapted for industrial applications. Hereinafter a general inventive method will first be described and thereafter a more detailed exemplary method will be described in the context of a control system.

Figure 4:
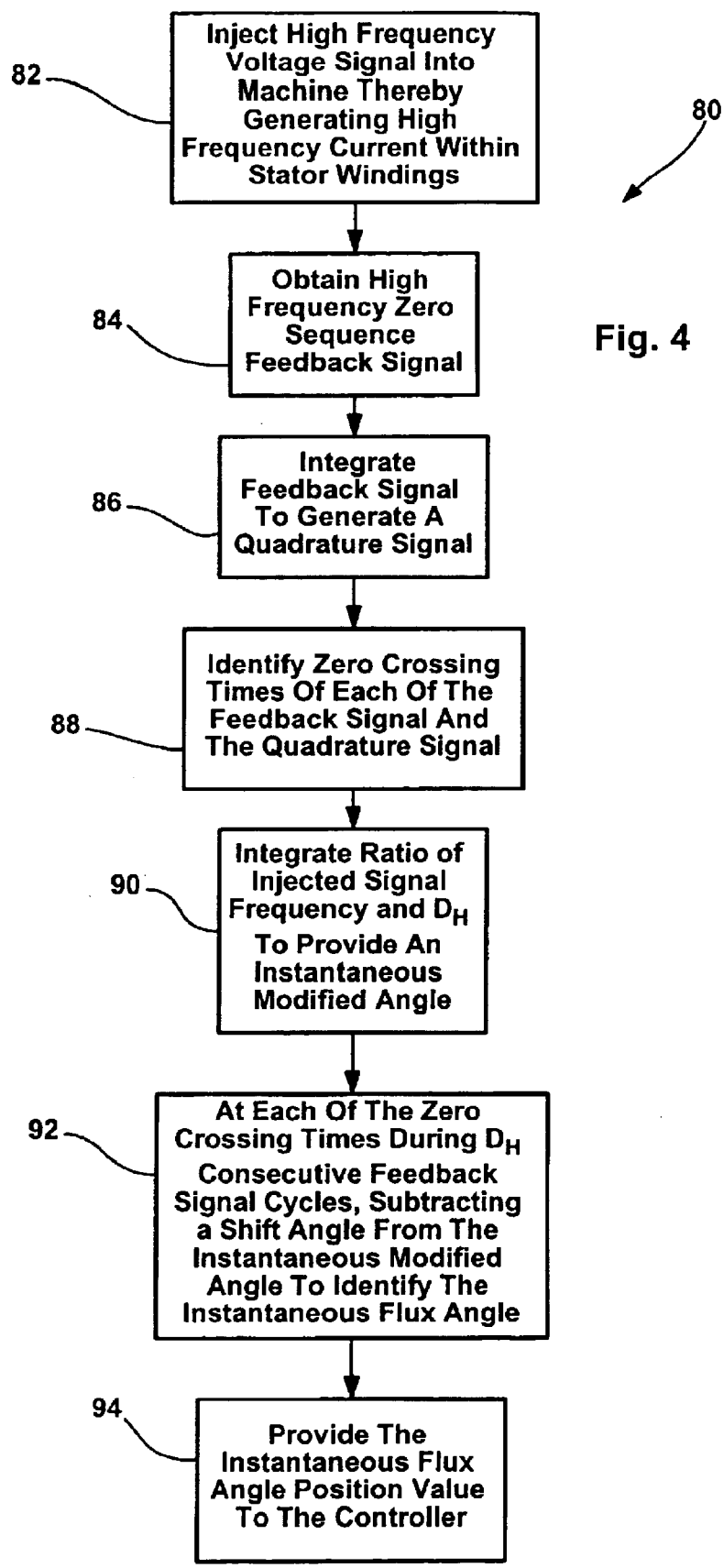
FIG. 4 is a flow chart illustrating an inventive method according to the present invention.

Referring now to the drawings wherein like reference characters represent similar elements and signals throughout the several views and, more specifically, a referring to FIG. 4, a general method 80 according to at least one aspect of the present invention is illustrated. Beginning at block 82, a high frequency voltage signal is injected into an operating machine thereby generating a high frequency current within stator windings of the machine. At block 84, a high frequency zero sequence feedback signal is obtained. Here, the feedback may be either a voltage or a current feedback signal. Hereinafter, unless indicated otherwise, it will be assumed that the feedback signal is a zero sequence voltage feedback signal $V_{hfzs}$ and the zero sequence signal will be referred to generically with label $\alpha_{zs}$. Continuing, at block 86, feedback signal $\alpha_{zs}$ is integrated to generate a quadrature signal $\beta_{zs}$ and at block 88 zero crossing times of each of the feedback signal $\alpha_{zs}$ and the quadrature signal $\beta_{zs}$ are identified.

At block 90, the frequency of the injected signal is divided by the dominant harmonic number $D_H$ and the resulting ratio is integrated to provide an instantaneous modified angle $\theta_{hD}$. At block 92, at each of the zero crossing times during $D_H$ consecutive feedback signal cycles, a different shift angle is subtracted from the instantaneous modified angle to identify an instantaneous flux angle $\theta_m$. At block 94, the instantaneous flux angle value is provided to a system controller for use according to any of several different algorithms well known in the art.

Now, for a more detailed description of an exemplary embodiment of the invention, reference is made to FIG. 5 where the present invention will be described in the context of an exemplary motor control system 10 including a plurality of summers 12, 14, 20, 22 and 24, a plurality of multipliers 34, 36 and 38, a current regulator 16, a 2-3 phase and synchronous to stationary frame transformer 18, a PWM inverter 26, a three phase motor 28, an integrator 30, a sine table 32, an A-D converter 40, a 3-2 phase and stationary to synchronous frame transformer 42, a flux angle determiner 46, a scalar 41 and a notch filter 52. In addition, depending on the system configuration employed, the system may further include one of a voltage zero sequence determiner 69 and a current zero sequence determiner 67.

Generally, system 10 receives two phase current command signals $i_q^*$ and $i_d^*$ and, based thereon, generates three phase voltages on motor supply lines linked to motor 28 to drive motor 28 in a desired fashion. The three phase voltages $V^*_u$, $V^*_v$ and $V^*_w$ together generate currents within each of the three motor phases. At least two of the three phase currents are sensed using hall effect sensors or some other suitable sensors (not numbered) and are provided as feedback currents to a feedback loop that is provided to eliminate the difference between the command currents $i_q^*$ and $i_{d*}$ and the resulting currents delivered to motor 28.

Command currents $i_q^*$ and $i_d^*$ are provided to summers 14 and 12, respectively. The three phase motor currents are converted in a manner which will be described in more detail below to two phase d and q access feedback currents $i_{df}$ and $i_{qf}$, respectively, the two phase feedback currents $i_{df}$ and $i_{qf}$ being provided to summers 12 and 14, respectively. Summer 12 subtracts the d-axis feedback current $i_{df}$ from the d-axis command current $i_d^*$ to generate a d-axis error signal, which is provided to regulator 16. Similarly, summer 14 subtracts the q-axis feedback current $i_{qf}$ from the q-axis command current $i_q^*$ to generate an error signal, which is provided to regulator 16. Regulator 16 converts the current error signals to command voltage signals $V_q^*$ and $V_d^*$, which are provided to 2-3 phase and synchronous to stationary frame transformer 18.

Transformer 18 receives phase angle $\theta_m$ from determiner 46 and, using the received angle, coverts the command voltages $V_q^*$ and $V_d^*$ to three phase command voltages $V^*_u$, $V^*_v$ and $V^*_w$. The three phase command voltages are provided to summers 20, 22 and 24, respectively. Each of summers 20, 22 and 24 also receives a high frequency injection voltage signal. Generation of the high frequency injection voltage signals is described in more detail below. Summer 20 adds the received signals (i.e., command signal $V^*_u$ and the high frequency injection voltage signal) and generates a modified single-phase voltage signal $V_{um}$, which is provided to inverter 26. Similarly, each of summers 22 and 24 adds their respective received signals and provides an output modified voltage signal $V_{vm}$ and $V_{wm}$, respectively, to inverter 26. Inverter 26 uses the modified voltage signals $V_{um}$, $V_{vm}$ and $V_{wm}$ to generate the three phase voltages $V_v$, $V_u$ and $V_w$ on the motor supply lines.

Figure 5:
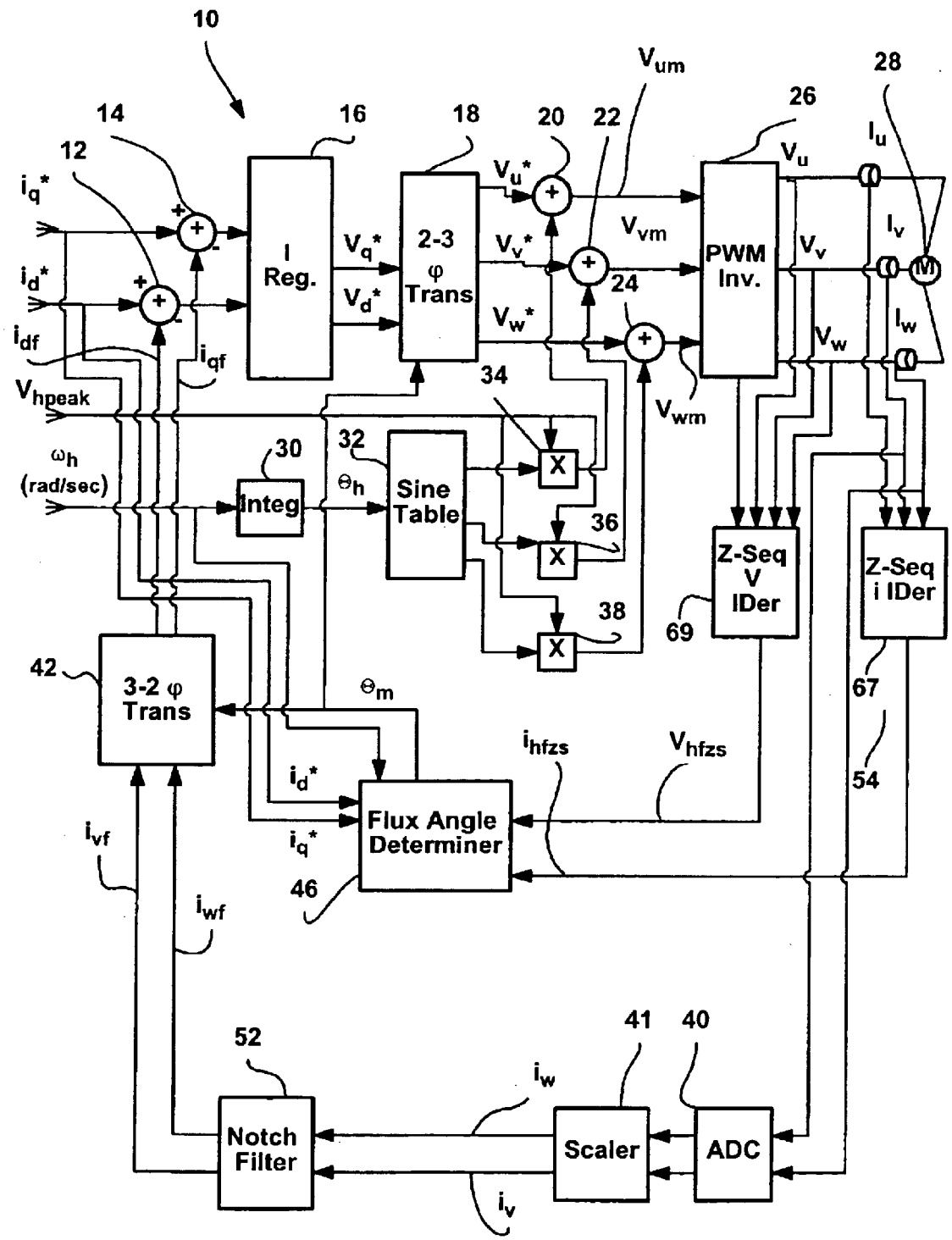
FIG. 5 is a schematic diagram of a motor control system according to the present invention.

Referring still to FIG. 5, in addition to command currents $i^*_q$ and $i_d^*$, two other values are provided as inputs to system 10 and are specifically used to generate the high frequency injection voltage signals that are added to the three phase command voltages $V^*_u$, $V^*_v$ and $V^*_w$ via summers, 20, 22 and 24. Specifically, a peak high frequency magnitude signal $V_{hpeak}$ and a high frequency signal $\omega_h$ are provided. High frequency signal $\omega_h$ is provided to determiner 46 and to integrator 30, which integrates the received signal and provides a high frequency angle $\omega_h$ to sine table 32.

Sine table 32 has first, second and third outputs which are linked to multipliers 34, 36 and 38, respectively. On the first output (i.e., the output linked to multiplier 34), sine table 32 provides the sine of high frequency angle $\Theta_h$. On the second output (i.e., the output linked to multiplier 36), sine table 32 provides the sine of $(\theta_h+2\pi/3)$. On the third output (i.e., the output linked to multiplier 38), sine table 32 provides the sine of $(\theta_h+4\pi/3)$. Thus, sine table 32 generates three outputs where the outputs are the sines of angles that are separated by 120°.

The peak high frequency amplitude signal $V_{hpeak}$ is also provided to each of multipliers 34, 36 and 38. Multiplier 34 multiplies its received signals to generate the high frequency injection voltage signal provided to summer 20. Similarly, each of multipliers 36 and 38 multiplies their respective received signals together to generate high frequency injection signals that are provided to summers 22 and 24, respectively. As indicated above, summers 20, 22 and 24 add the high frequency signals to the three phase command signals $V^*_u$, $V^*_v$ and $V^*_w$ to generate the modified voltages $V_{um}$, $V_{vm}$ and $V_{wm}$ to drive inverter 26.

Referring still to FIG. 5, the feedback currents from the two of the three motor phases are provided to the analog to digital converter 40 and scalar 41 which convert the received signals to digital signals and step up the signals where appropriate by a scalar number. Scalar 41 provides current feedback signals $i_v$ and $i_w$ to notch filter 52.

Notch filter 52 provides three-phase feedback currents $i_{vf}$ and $i_{wf}$ including components only within a specific notch range. More specifically, the notch range will typically exclude the high frequency $\omega_h$ provided to integrator 30. In this manner, the injected high frequency currents should be filtered out and should not directly effect the comparison of command and feedback currents by summers 12 and 14.

The three phase currents output by notch filter 52 are provided to the three to two phase and stationary to synchronous frame transformer 42. As well known in the controls art, any two phases of the three are enough for the three to two phase conversion and therefore, transformer 42 uses any two of the three phase feedback currents (e.g., $i_{uf}$ and $i_{wf}$) and electrical angle $\theta'_e$ provided by position-speed determiner 46 to generate the d and q-axis feedback currents $i_{df}$ and $i_{qf}$, respectively. As described above, the d and q-axis feed back currents $i_{df}$ and $i_{qf}$, respectively, are provided to summers 12 and 14 and are subtracted from corresponding command current signals $i_q^*$ and $i_d^*$.

Referring still to FIG. 5, some embodiments will include identifier 69 while others will include identifier 67. While a system typically would not include both identifiers 67 and 69 it is contemplated that some embodiments could include both identifiers 67 and 69. Operation of the present invention is essentially identical irrespective of which of identifiers 67 or 69 is used with the invention. Therefore, in the interest of simplifying this explanation, unless indicated otherwise, the inventive concepts will be described in the context of a system including zero sequence voltage identifier 69.

Referring still to FIG. 5, identifier 69 receives voltage feedback signals from all three of the motor phases and is also linked to a neutral point of inverter 26. Identifier 69 includes a bandpass filter to generate the high frequency portion of the voltage zero sequence. Operation of identifiers like identfier 69 is well known in the art and therefore will not be explained here in detail. Suffice it to say here that identifier 69 generates zero sequence high frequency voltage signals $V_{hfzs}$ that is provided to determiner 46. In embodiments including the zero sequence current identifier 67 instead of the zero sequence voltage identifier 69, identifier 67 generates a high frequency feedback zero sequence current signal $I_{hfzs}$ which is provided to determiner 46. As indicated above symbol $\alpha_{zs}$ is used to refer generically to the zero sequence feedback signal independent of whether or not the zero sequence signal is a current or a voltage signal.

Figure 6:
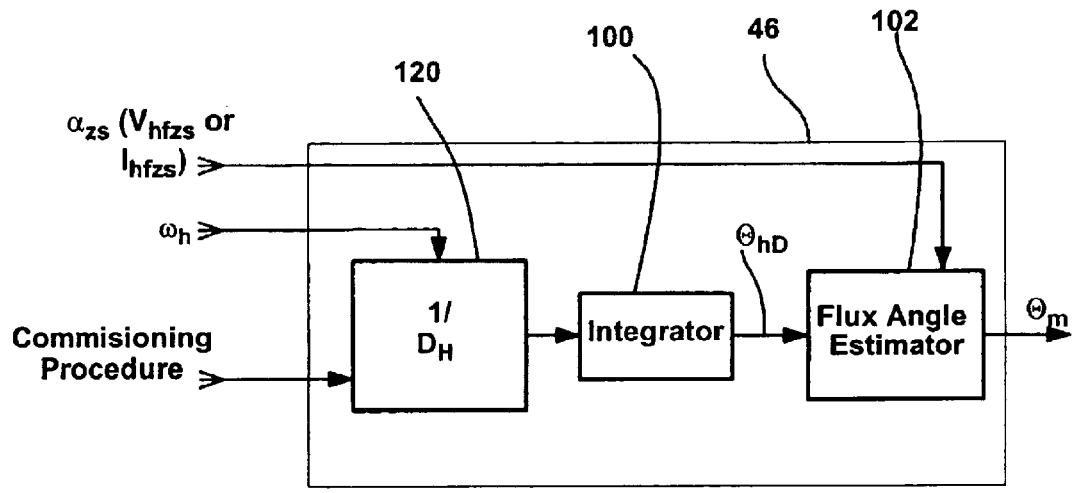
FIG. 6 a schematic diagram illustrating one embodiment of the flux angle determiner of FIG. 5.

Referring now to FIG. 6, exemplary components of flux angle determiner 46 in FIG. 5 include a divider 120, an integrator 100 and a flux angle estimator 102. Divider 120 is programmed with a system specific dominant harmonic number $D_H$ which is determined during a commissioning procedure in any of several different manners well known in the art. Divider 120 receives frequency $\omega_h$ in radians per second and divides that value by the dominant harmonic number $D_H$. That value is provided to integrator 100 which integrates the received value thereby generating a modified angle $\theta_{hD}$. For example, where the frequency of the injected signal is 500 Hz and the system specific dominant harmonic number $D_H$ is 2, divider 120 provides a 250 Hz value to integrator 100. Referring again to FIG. 3a, when the 250 Hz signal is integrated, a changing modified angle $\theta_{hD}$ as illustrate in FIG. 3a is generated. In addition to receiving the instantaneous modified angle $\theta_{hD}$, estimator 102 also receives the zero sequence feedback signal $\alpha_{zs}$. Estimator 102 uses the modified angle $\theta_{hD}$ and zero sequence feedback signal $\alpha_{zs}$ to identify main field flux $\theta_m$.

Figure 7:
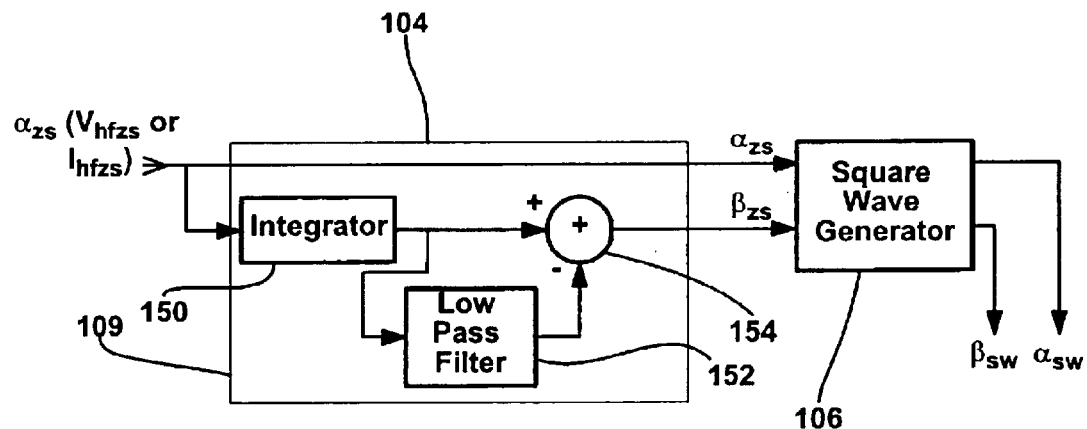
FIGS. 7 and 8 are schematic diagrams that together illustrate the components of one embodiment of the flux angle estimator of FIG. 6.
Figure 8:
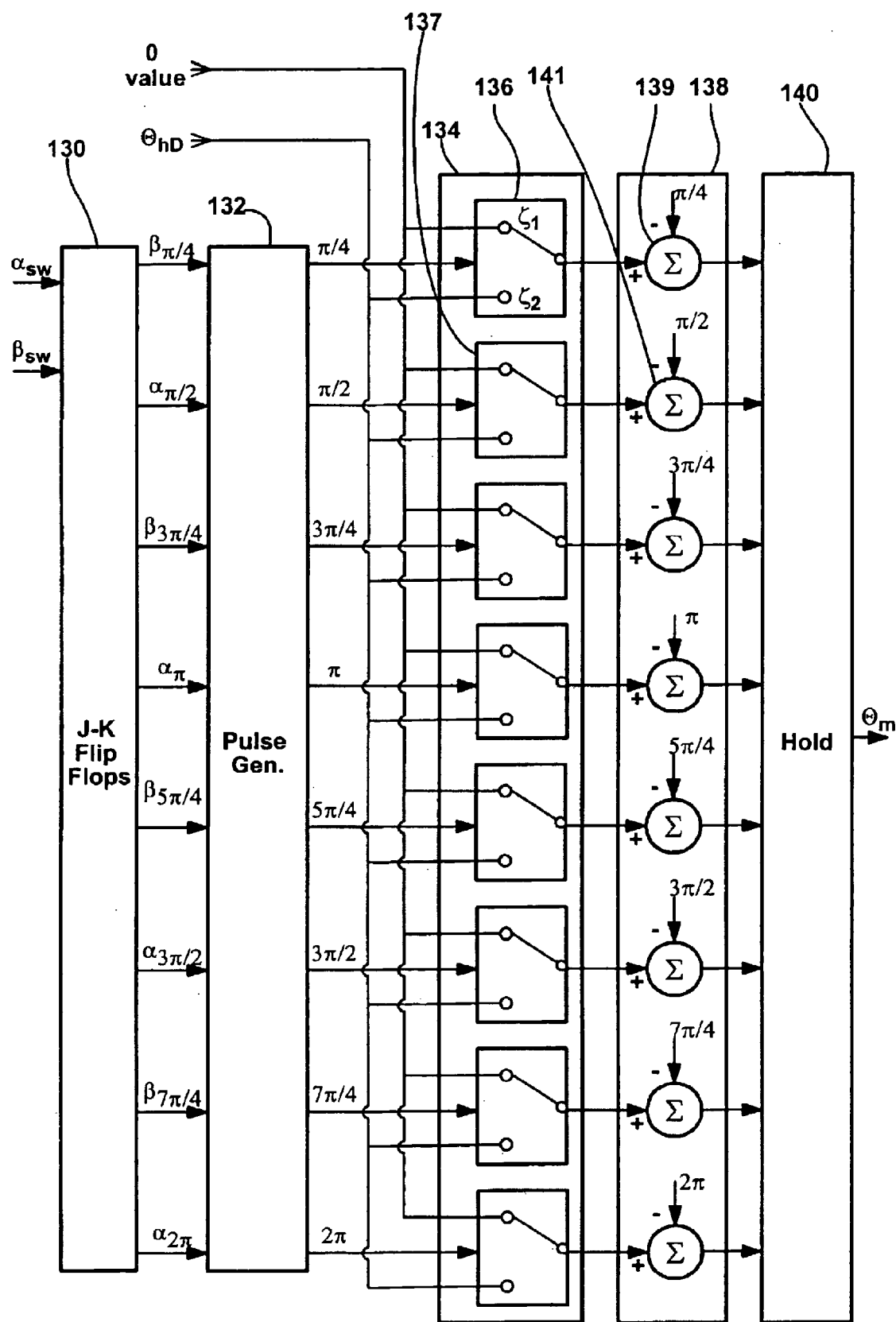
Figure 9:
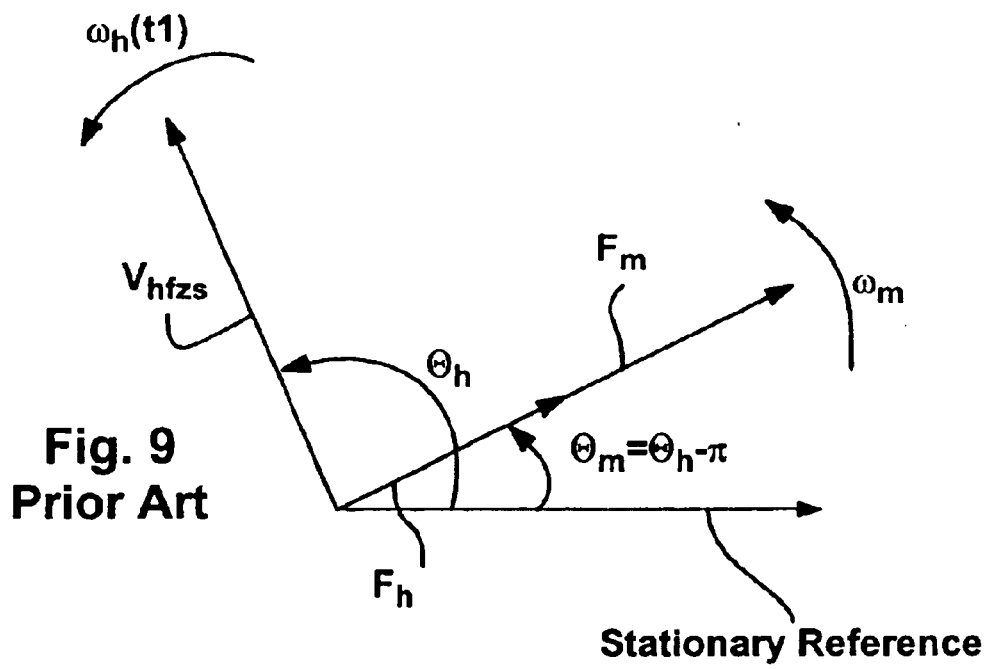
FIG. 9 is a phasor diagram illustrating the relationship between various system operating parameters in a system including a high frequency injection voltage.
Figure 10:
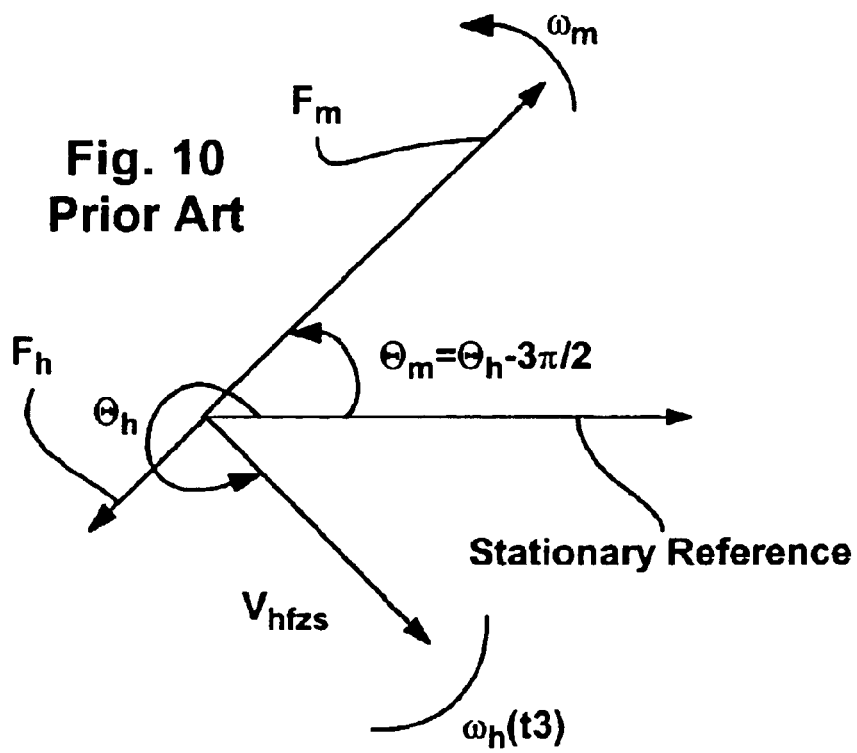
FIG. 10 is similar to FIG. 9 albeit at a different instant in time.

Referring now to FIGS. 7 and 8, components that comprise one embodiment of the flux angle estimator 102 in FIG. 6 are illustrated. Referring specifically to FIG. 7, a module 104 receives the zero sequence signal $\alpha_{zs}$ and uses that signal to generate quadrature zero sequence signal $\beta_{zs}$. To generate the quadrature signal $\beta_{zs}$, module 104 includes an integrator 150, a summer 154 and a low pass filter 152. Integrator 150 receives zero sequence signal $\alpha_{zs}$ and integrates that signal thereby providing an integrated signal including a high frequency component and a low frequency component. The integrated signal is provided to low pass filter 152 which, as its label implies, low pass filters the signal so that its output comprises the low frequency component. Summer 154 receives the integrated signal and subtracts the low frequency component therefrom thereby generating quadrature zero sequence signal $\beta_{zs}$.

Each of signals $\alpha_{zs}$ and $\beta_{zs}$ are provided to a square wave generator 106. As its label implies, square wave generator 106 generates square wave signals $\alpha_{sw}$ and $\beta_{sw}$ as a function of the receive signals $\alpha_{zs}$ and $\beta_{zs}$. To this end, referring now to FIG. 13, exemplary $\alpha_{zs}$ and $\beta_{zs}$ waveforms are illustrated where the two waveforms are in quadrature. In addition, FIG. 13 includes a plurality of signals that are generated by square wave generator 106 and other components illustrated in FIG. 8. As illustrated, the square wave $\alpha_{sw}$ provided by generator 106 is high when a corresponding waveform $\alpha_{zs}$ is positive and is low when waveform $\alpha_{zs}$ is negative while square wave $\beta_{sw}$ provided by generator 106 is high when associated waveform $\beta_{zs}$ is negative and is low when waveform $\beta_{zs}$ is positive.

Referring now to FIG. 8, estimator 102 components in FIG. 8 include a plurality of JK flip-flops collectively identified by numeral 130, a pulse generating circuit 132, a switch module 134 including a plurality of switches, two of which are identified by numerals 136 and 137, respectively, a summing module 138 that includes a plurality of summers, two of the summers identified by numerals 139 and 141, respectively, and a hold module 140.

Flip-flop module 130 includes a plurality of flip-flops that are used to generate four $D_H$ different square waves as a function of square waves $\alpha_{sw}$ and $\beta_{sw}$. Although not illustrated, the nature of the flip-flops and their operation should be apparent from the timing diagrams in FIG. 13. Consistent with the present example where the dominant harmonic number $D_H$ is 2, twelve separate flip-flops FF-1 through FF-12 are provided in module 130. The first flip-flop FF-1 receives waveform $\alpha_{sw}$ and changes state each time waveform $\alpha_{sw}$ goes positive thereby generating a square wave signal $\alpha_{sw}^+/2$ which has a frequency half that of $\alpha_{sw}$. Similarly, the second flip-flop FF-2 receives waveform $\alpha_{sw}$ and changes its state each time waveform $\alpha_{sw}$ changes from positive to negative thereby generating a square wave signal $\alpha_{sw}^-/2$ having a frequency that is half the frequency of waveform $\alpha_{sw}$.

Figure 13:
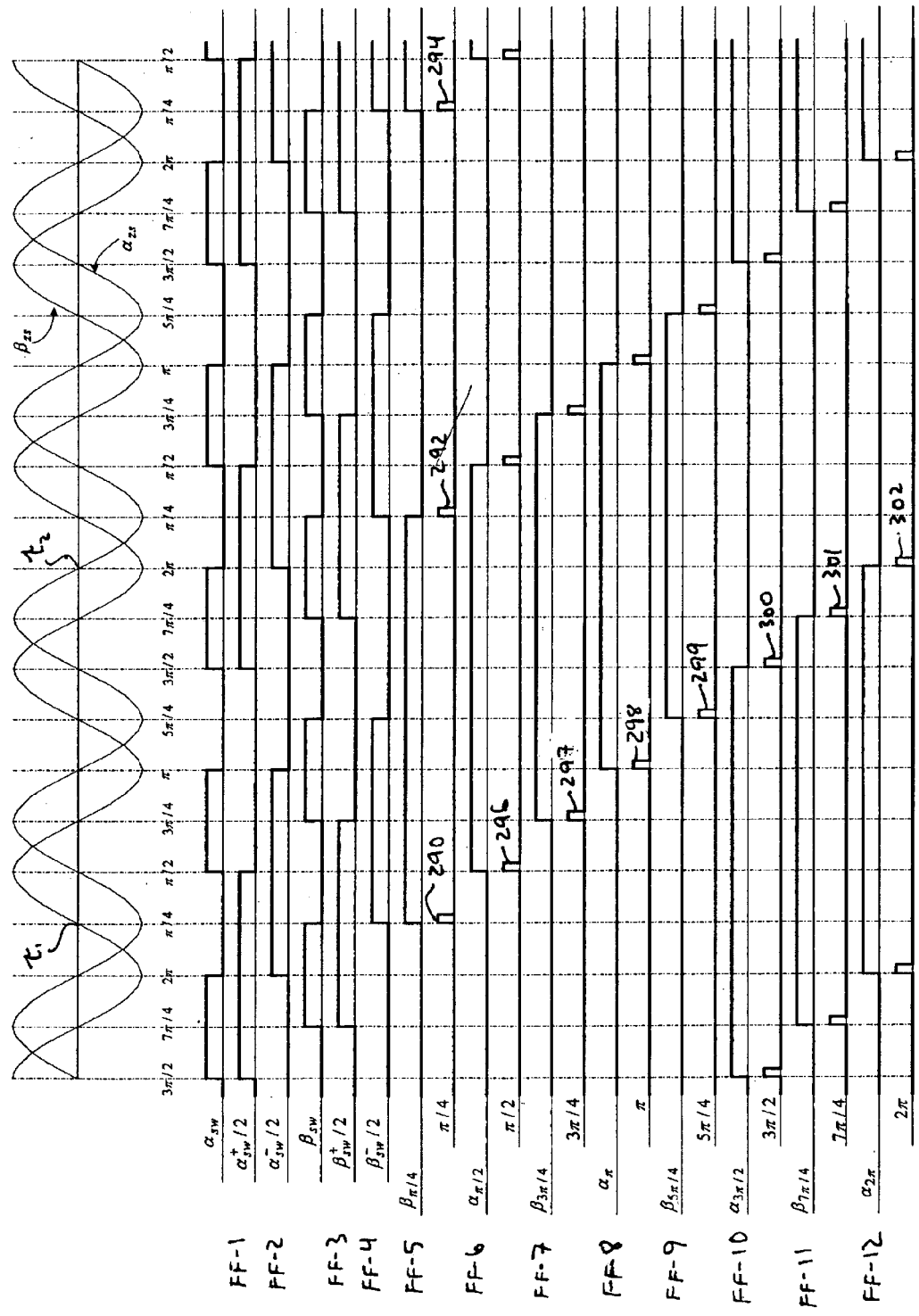
FIG. 13 is a graph and timing diagram illustrating a high frequency zero sequence feedback signal and a corresponding quadrature signal and timing diagrams corresponding to the components illustrated in FIG. 8.

Referring still to FIG. 13, the third flip-flop FF-3 receives signal $\beta_{sw}$ and changes state whenever waveform $\beta_{sw}$ goes high thereby generating a square wave signal $\beta_{sw}^+/2$ having a frequency half of that of waveform $\beta_{sw}$. In addition, the fourth flip-flop FF-4 receives waveform $\beta_{sw}$ and changes state each time waveform $\beta_{sw}$ goes low thereby generating a square wave signal $\beta_{sw}^-/2$ which, again, has a frequency that is half the frequency of waveform $\beta_{sw}$.

Each one of the first through fourth flip-flops provides its output to two additional flip-flops which, in the fashion similar to that described above, generates two other square waves where each of the other square waves has a frequency which is half that of the received signal. For example, referring still to FIG. 13, waveform $\beta_{sw}^-/2$ is provide to fifth and ninth flip-flops FF-5 and FF-9, respectively, to generate two additional waveforms $\alpha_{\pi/4}$ and $\beta_{5\pi/4}$ where fifth flip-flop FF-5 changes state each time signals $\beta_{sw}^-/2$ goes high while flip-flop FF-9 changes state each time waveform $\beta_{sw}^-/2$ goes low. Similarly, waveform $\alpha_{sw}^+/2$ is provided to each of flip-flops FF-6 and FF-10, waveform $\alpha_{sw}^-/2$ is provided to each flip-flops FF-8 and FF-12 and waveform $\alpha_{sw}^+/2$ is provided to each flip-flops FF-7 and FF-11 to generate waveforms $\alpha_{\pi/2}$, $\alpha_{3\pi/2}$, $\alpha_\pi$, $\alpha_{2\pi}$, $\beta_{3\pi/4}$ and $\beta_{7\pi/4}$, respectively. Referring again to FIG. 8, each of waveforms $\beta_{\pi/4}$, $\alpha_{\pi/2}$, $\beta_{3\pi/4}$, $\alpha_\pi$, $\beta_{5\pi/4}$, $\alpha_3\pi 3/2$, $\beta_{7\pi/4}$ and $\alpha_{2\pi}$ are provided to pulse generator 132.

Referring still to FIG. 13, importantly, waveforms $\beta_{\pi/4}$, $\alpha_{\pi/2}$, $\beta_{3\pi/4}$, $\alpha_x$, $\beta_{\pi/4}$, $\alpha_{3\pi/2}$, $\beta_{7\pi/4}$ and $\alpha_{2\pi}$ can be used together during two consecutive cycles of zero sequence feedback signal $\alpha_{zs}$ to identify times when signal $\alpha_{zs}$ is at a minimum value, transitions from negative to positive, is at a maximum value and transitions from positive to negative during the first cycle and is at a minimum value, transitions from negative to positive, is at a maximum value and transitions from positive to negative during the second cycle, respectively. In this regard see the two cycles between times $\tau_1$ and $\tau_2$ in FIG. 13 where each of the aforementioned signals changes state at a different one of the times of interest. Thus, the aforementioned signals are useable to identify times corresponding to points a, b, c, d, e, k, $\theta_m$ and n in FIG. 4 and hence are useable to trigger calculation of angle $\theta_m$ via Equations 10 through 17 described above.

Referring again to FIGS. 8 and 13, pulse generator 132 generates a pulse each time one of the received signals changes state. For example, pulse waveform $\pi/4$ includes a short duration pulse 290 when waveform $\beta_{\pi/4}$ goes high, generates another pulse 292 when waveform $\beta_{\pi/4}$ goes low, generates another pulse 294 when waveform $\beta_{\pi/4}$ again goes high, and so on. Other pulse waveforms illustrated in FIG. 13 and corresponding to similarly labeled square waveforms thereabove include pulse waveforms $\pi/2$, $3\pi/4$, $\pi$, $5\pi/4$, $3\pi/2$, $7\pi/4$ and $2\pi$. Each of the pulse waveforms is provided on a separate line to switch module 134.

Referring still to FIG. 8, switch module 134 includes $D_H$ separate single pole double throw switches. Two switches are labeled with numerals 136 and 137. Each of the switches in module 134 has an identical configuration and similar operation and therefore, in the interest of simplifying this explanation, only switch 136 will be described in detail. Here, it should suffice to say that each of the outputs from generator 132 is provided to a separate one of the switches in module 134 for controlling the switch.

Referring still to FIG. 8, switch 136 includes first and second inputs labeled $\zeta_1$ and $\zeta_2$, respectively, and a single output and is controlled by an associated pulse waveform $\pi/4$ received from pulse generator 132. Here, the output of switch 136 is normally closed to input $\zeta_1$ and switch 136 switches and connects input $\zeta_2$ to the output whenever a pulse is received on the control line from pulse generator 132. Thus, referring also to FIG. 13, when pulse 290 is provided to switch 136, switch 136 changes state and connects to input $\zeta_2$ for a brief moment.

As illustrated in FIG. 8, each of first inputs $\zeta_1$ to the module switches is linked to a zero value while each of second inputs $\zeta_2$ is linked to the instantaneous modified angle value $\theta_{hD}$ provided by integrator 100 in FIG. 6. Thus, each of the module switches provides a zero output value unless a trigger pulse is received from pulse generator 132. Hence, referring once again to FIG. 13, every time a pulse is provided by generator 132, one of the switches in module 134 provides modified angle $\theta_{hD}$ to summing module 138.

Summing module 138 includes $D_H$ summers, a separate summer (two labeled 139 and 141) for each of the switches in modules 134. Each of the summers in module 138 is identical and operates in a similar fashion, and therefore, in the interest of simplifying this explanation, only summer 139 which is linked to switch 136 in module 134 is described in any detail. Here, is should suffice to say that each of the summers in module 138 is programmed with a different shift angle. For example, summer 139 is programmed with a shift angle of $\pi/4$ and subtracts angle $\pi/4$ from the modified angle $\theta_{hD}$ whenever switch 136 provides angle $\theta_{hD}$. Similarly, summer 141 is programmed with a shift angle of $\pi/2$ and subtracts shift angle $\pi/2$ from modified angle $\theta_{hD}$ whenever the corresponding switch 173 in module 134 provides angle $\theta_{hD}$. The other summers in module 138 are programmed with shift angles $3\pi/4$, $\pi$, $5\pi/4$, $3\pi/2$, $7\pi/4$ and $2\pi$. Each of the outputs from the summers in module 138 is provided to hold module 140.

During periods when value $\theta_{hD}$ is not provided to a summer in module 138, the summer does not provide a value to hold module 140. Thus, for instance, referring again to FIG. 13, between pulses 290 and 291 when switch 136 links input $\zeta_1$ (i.e., the zero value) to summer 139, summer 139 does not provide an output to module 140.

As its label implies, hold module 140 receives outputs from summers in module 138 and holds the value of the summer that most recently subtracted its shift angle from the modified angle $\theta_{hD}$ until a next summer performs a subtraction. The value held by module 140 is the main field flux angle $\theta_m$ which is provided to other system components as illustrated in FIG. 5. Thus, referring again to FIG. 13, each two cycles of zero sequence feedback signal $\alpha_{zs}$, eight separate pulses (e.g., 209, 296, 297, 298, 299, 300, 301 and 302 between times $\tau_1$ and $\tau_2$) are provided to module 134 and hence angle $\theta_m$ is updated eight times according to Equations 10 through 17 above.

Figure 11:
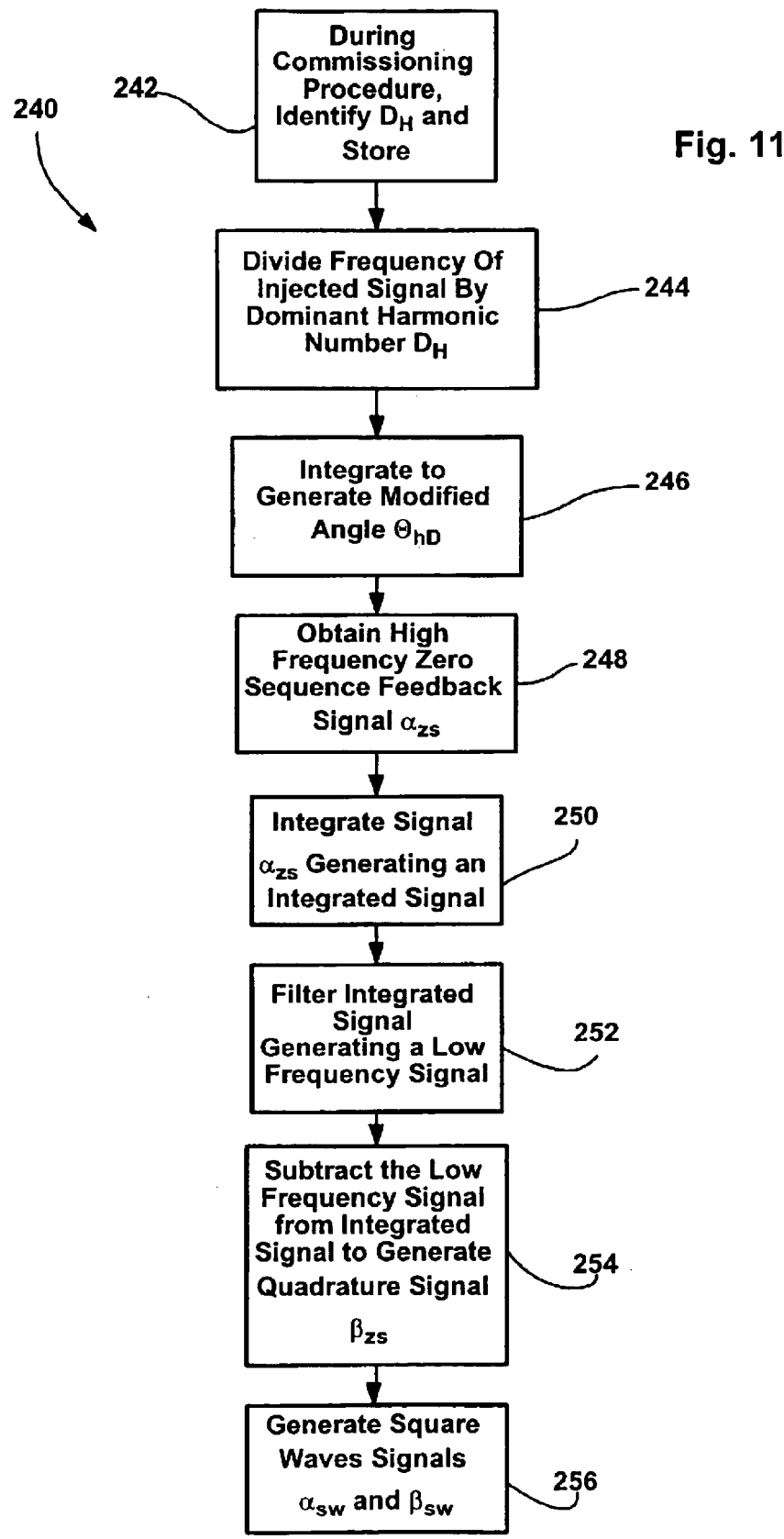
FIG. 11 is a flow chart illustrating an exemplary method performed by the components of FIGS. 6 and 7 above.

Referring now to FIG. 11, an exemplary more detailed method 240 according to the present invention is illustrated. Here, as above, it will be assumed that the system specific document harmonic number $D_H$ is 2. Referring also to FIG. 6, at block 242, during a commissioning procedure, the system specific dominant harmonic number $D_H$ (i.e., 2 in the example) is identified and stored. At block 244, divider 120 divides the frequency of the injected signal by the dominant harmonic number $D_H$ and at block 246 integrator 100 integrates the result to generate instantaneous modified angle $\theta_{hD}$.

Continuing and, referring to FIGS. 5 and 11, at block 248, the high frequency zero sequence feedback signal $\alpha_{zs}$ is obtained. Referring also to FIG. 7, at block 250, signal $\alpha_{zs}$ is integrated by integrator 150 and at block 252, low pass filter 152 filters the integrated signal to generate a low frequency signal which is provided to summer 154. At block 254, summer 154 subtracts the low frequency signal from the integrated signal to generate quadrature signal $\beta_{zs}$. At block 256, square wave generator 106 receives signals $\alpha_{zs}$ and $\beta_{zs}$ and uses those signals to generate the square wave signals $\alpha_{sw}$ and $\beta_{sw}$ illustrated in FIG. 13.

Figure 12:
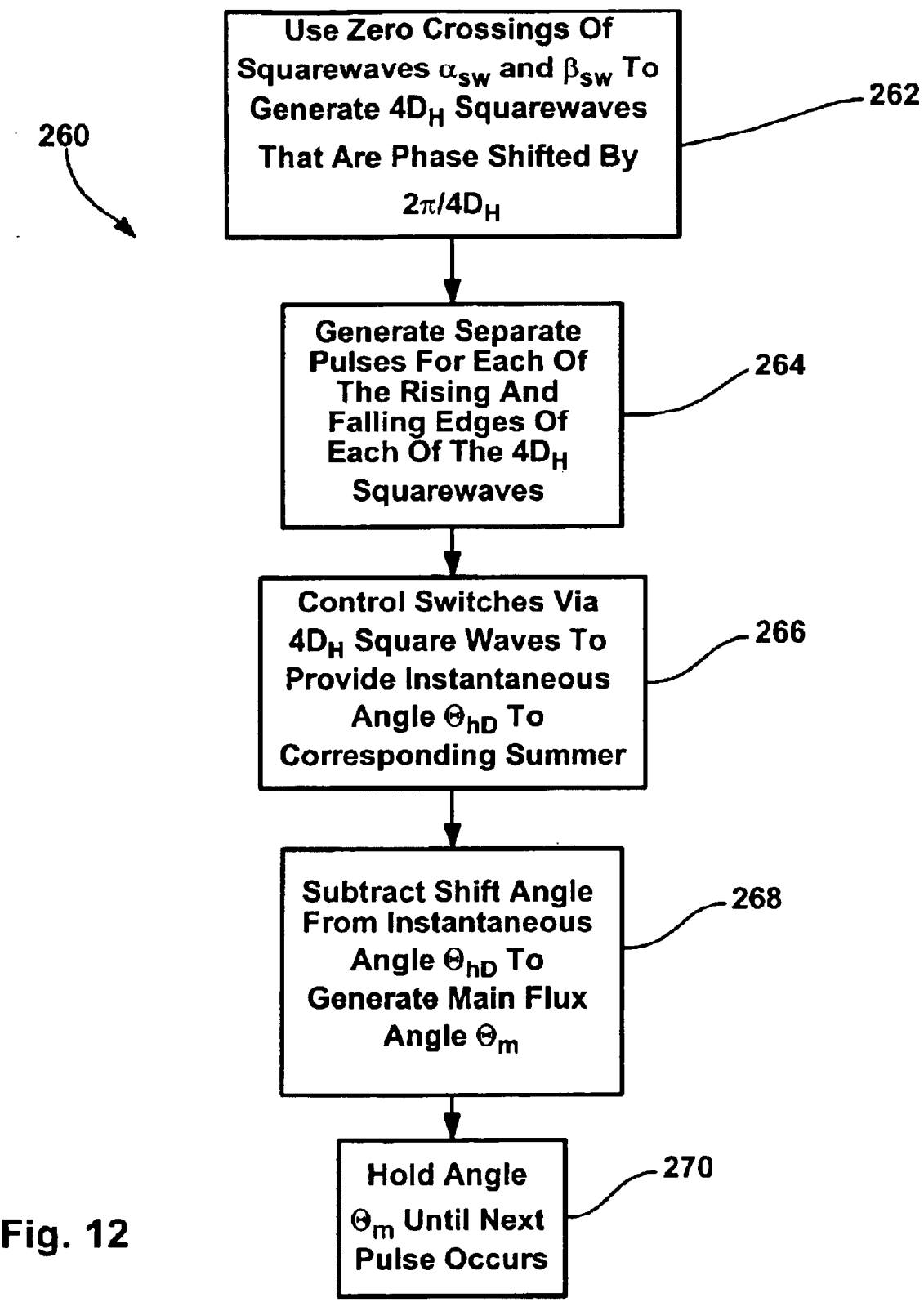
FIG. 12 is a flow chart illustrating an exemplary method performed by the components of FIG. 8.

Referring now to FIG. 12, a continuation 260 of the method illustrated in FIG. 11 is shown. Referring also to FIG. 8, at block 262, flip-flop module 130 is controlled as a function of the zero crossings of square waves $\alpha_{sw}$ and $\beta_{sw}$ to generate $D_H$ eight square waves that are phase shifted from each other by $\pi/4$. Continuing, at block 264, pulse generator 132 generates pulses as illustrated in FIG. 13 as a function of the square waves received from flip-flop module 130. At block 266, the outputs of pulse generator 132 are used to control the switches in module 134 to provide instantaneous modified angle $\theta_{hD}$ to one of the summers in module 138 each time a pulse is received from module 132. At block 268, summing module 138 subtracts a shift angle from the instantaneous modified angle $\theta_{hD}$ to generate the main field flux angle $\theta_m$ which is provided to module 140. Module 140 hold the angle $\theta_m$ until the next pulse occurs.

As described above, where the dominant harmonic number $D_H$ is other than two, a method and apparatus similar to that described above is contemplated. For instance, where number $D_H$ is four, angle $\theta_{hD}$ is determined by integrating the ratio of the frequency of the injected voltage and number 4 (e.g, $D_H$) and a configuration similar to that in FIG. 8 is used to identify sixteen (e.g., $4D_H$) different trigger times during one cycle of angle $\theta_{hD}$ which are in turn used to generate sixteen $\theta_m$ values. Here the shift angle are separated by $\pi/8$ (e.g., $2\pi/4D_H$).

As another instance, where $D_H$ is eight, angle $\theta_{hD}$ is determined by integrating the ratio of the injected signal frequency divided by 8 and thirty-two equations having shift angles separated by $\pi/16$ are employed during each cycle of angle $\theta_{hD}$ to achieve performance on a par with Consoli.

It should be understood that the methods and apparatuses described above are only exemplary and do not limit the scope of the invention, and that various modifications could be made by those skilled in the art that would fall under the scope of the invention.

To apprise the public of the scope of this invention, the following claims are made:

What is claimed is:

1. A method for use with a controller that uses a flux angle position value to control a three phase induction machine, the method for determining an instantaneous flux angle position value in the machine where the machine is characterized by a system specific dominant harmonic frequency number $D_H$ that is at least two, the method comprising the steps of:

injecting a high frequency voltage signal having a high frequency value into the machine thereby generating a high frequency current within the stator windings;

obtaining a high frequency feedback signal from the machine;

mathematically combining the high frequency value and the dominant harmonic number $D_H$ to provide an instantaneous modified angle;

using the feedback signal to identify X consecutive calculating instances during each Y consecutive feedback signal cycles where Y is at least two;

at each of the X different calculating instances, identifying an instantaneous flux angle position value by mathematically combining a shift angle with the modified angle where the shift angles corresponding to each of the X different calculating instances are all different; and providing the instantaneous flux angle position value to the controller.

2. The method of claim 1 wherein the step of obtaining a high frequency feedback signal includes obtaining one of a high frequency zero sequence current feedback signal and a high frequency zero sequence voltage feedback signal.

3. The method of claim 1 wherein the step of mathematically combining the high frequency value and the dominant harmonic number $D_H$ to provide an instantaneous modified angle includes dividing the high frequency value by the dominant harmonic number and integrating.

4. The method of claim 3 wherein Y is $D_H$ and X is four.

5. The method of claim 4 wherein the shift angles are multiples of $2\pi/4D_H$.

6. The method of claim 5 wherein first through fourth calculating instances during each feedback signal cycle include the times during the cycle at which the high frequency feedback signal crosses zero from positive to negative, the high frequency feedback signal reaches a negative maximum magnitude, the high frequency feedback signal crosses zero from negative to positive and the high frequency feedback signal reaches a positive maximum magnitude, respectively.

7. The method of claim 6 wherein $D_H$ is 2 and first through fourth shift angles during one of the two consecutive feedback signal cycles include values $2\pi$, $\pi/4$, $\pi/2$ and $3\pi/4$ while first through fourth shift angles corresponding to the other of the two consecutive feedback signal cycles include values $\pi$, $5\pi/4$, $3\pi/2$ and $7\pi/4$, respectively.

8. The method of claim 6 wherein $D_H$ is 4 and first through fourth shift angles during one of the four consecutive feedback signal cycles include values $2\pi$, $\pi/8$, $\pi/4$ and $3\pi/8$, first through fourth shift angles corresponding to another of the four consecutive feedback signal cycles include values $\pi/2$, $5\pi/8$, $3\pi/4$ and $7\pi/8$, first through fourth shift angles corresponding to another of the four consecutive feedback signal cycles include $\pi$, $9\pi/8$, $5\pi/4$ and $11\pi/8$ and first through fourth shift angles corresponding to another of the four consecutive feedback signal cycles include $3\pi/2$, $13\pi/8$, $7\pi/4$ and $15\pi/8$, respectively.

9. The method of claim 1 further including the step of integrating the high frequency feedback signal to generate a quadrature signal and, wherein, the step of using the feedback signal to identify X consecutive calculating instances during each Y consecutive feedback signal cycles includes identifying the zero crossing times of each of the feedback signal and the quadrature signal and using the zero crossing times as the calculating instances.

10. The method of claim 9 wherein Y is $D_H$ and X is 4.

11. The method of claim 10 wherein $D_H$ is one of 2 and 4.

12. The method of claim 1 wherein the step of mathematically combining a shift angle with instantaneous modified angle includes adding the shift angle and the modified angle.

13. A method for use with a controller that uses a flux angle position value to control a three phase induction machine, the method for determining an instantaneous flux angle position value in the machine where the machine is characterized by a system specific dominant harmonic frequency number $D_H$ that is at least two, the method comprising the steps of:

injecting a high frequency voltage signal having a high frequency value into the machine thereby generating a high frequency current within the stator windings;

obtaining one of a high frequency zero sequence voltage feedback signal and a high frequency zero sequence current feedback signal from the machine;

dividing the high frequency value and the dominant harmonic number $D_H$ to provide an instantaneous modified angle;

using the feedback signal to identify four consecutive calculating instances during each of Y consecutive feedback signal cycles where Y is at least two;

at each of the calculating instances during the Y consecutive feedback signal cycles, identifying an instantaneous flux angle position value by mathematically combining a shift angle with the instantaneous modified angle where the shift angles corresponding to each of the calculating instances during the Y consecutive feedback signal cycles are all unique shift angles; and providing the instantaneous flux angle position value to the controller.

14. The method of claim 13 wherein Y is $D_H$ and the shift angles are multiples of $2\pi/4D_H$.

15. The method of claim 14 wherein $D_H$ is one of two, four and eight.

16. The method of claim 13 further including the step of integrating the high frequency feedback signal to generate a quadrature signal and, wherein, the step of using the feedback signal to identify X consecutive calculating instances during each Y consecutive feedback signal cycles includes identifying the zero crossing times of each of the feedback signal and the quadrature signal and using the zero crossing times as the calculating instances.

17. A method for use with a controller that uses a flux angle position value to control a three phase induction machine, the method for determining an instantaneous flux angle position value in the machine where the machine is characterized by a system specific dominant harmonic frequency number $D_H$ that is at least two, the method comprising the steps of:

injecting a high frequency voltage signal having a high frequency into the machine thereby generating a high frequency current within the stator windings;

obtaining one of a high frequency zero sequence voltage feedback signal and a high frequency zero sequence current feedback signal from the machine;

integrating the feedback signal to generate a quadrature signal;

identifying the zero crossing times of each of the feedback signal and the quadrature signal;

dividing the high frequency by the dominant harmonic number $D_H$ to provide an instantaneous modified angle;

at each of the zero crossing times during $D_H$ consecutive feedback signal cycles, identifying an instantaneous flux angle position value by mathematically combining a shift angle with the instantaneous modified angle where the shift angles corresponding to each of the zero crossing times during the $D_H$ consecutive feedback signal cycles are all unique shift angles and are multiples of $2\pi/4D_H$; and providing the instantaneous flux angle position value to the controller.

18. The method of claim 17 wherein $D_H$ is one of two and four.

19. An apparatus for use with a controller that uses a flux angle position value to control a three phase induction machine, the apparatus for determining an instantaneous flux angle position value in the machine where the machine is characterized by a system specific dominant harmonic frequency number $D_H$ that is at least two, the apparatus comprising:

a programmed processor performing the steps of:

injecting a high frequency voltage signal having a high frequency value into the machine thereby generating a high frequency current within the stator windings;

obtaining a high frequency feedback signal from the machine;

mathematically combining the high frequency value and the dominant harmonic number $D_H$ to provide an instantaneous modified angle;

using the feedback signal to identify X consecutive calculating instances during each Y consecutive feedback signal cycles where Y is at least two;

at each of the X different calculating instances, identifying an instantaneous flux angle position value by mathematically combining a shift angle with the instantaneous modified angle where the shift angles corresponding to each of the X different calculating instances are all different; and providing the instantaneous flux angle position value to the controller.

20. The apparatus of claim 19 wherein processor performs the step of obtaining a high frequency feedback signal by obtaining one of a high frequency zero sequence current feedback signal and a high frequency zero sequence voltage feedback signal.

21. The apparatus of claim 19 wherein the processor performs the step of mathematically combining the high frequency value and the dominant harmonic number $D_H$ to provide an instantaneous modified angle by dividing the high frequency value by the dominant harmonic number and integrating.

22. The apparatus of claim 21 wherein Y is $D_H$, X is four and the shift angles are multiples of $2\pi/4D_H$.

23. The apparatus of claim 6 wherein $D_H$ is one of two and four.

24. The apparatus of claim 19 wherein the processor further performs the step of integrating the high frequency feedback signal to generate a quadrature signal and, wherein, the processor performs the step of using the feedback signal to identify X consecutive calculating instances during each Y consecutive feedback signal cycles by identifying the zero crossing times of each of the feedback signal and the quadrature signal and using the zero crossing times as the calculating instances.

25. The apparatus of claim 19 wherein the step of mathematically combining a shift angle with the instantaneous modified angle includes adding the shift angle and the modified angle.

* * * * *